United States Patent
Ji et al.

(10) Patent No.: US 12,095,552 B2
(45) Date of Patent: Sep. 17, 2024

(54) MESSAGE TRANSMISSION METHOD AND DEVICE

(71) Applicant: HUAWEI TECHNOLOGIES CO., LTD., Shenzhen (CN)

(72) Inventors: Tong Ji, Beijing (CN); Zhe Jin, Beijing (CN); Zhihu Luo, Beijing (CN); Weiliang Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/315,347

(22) Filed: May 10, 2023

(65) Prior Publication Data

US 2023/0283402 A1    Sep. 7, 2023

Related U.S. Application Data

(63) Continuation of application No. 17/317,530, filed on May 11, 2021, now Pat. No. 11,722,242, which is a
(Continued)

(30) Foreign Application Priority Data

Jan. 11, 2017  (WO) ............... PCT/CN2017/070927
Feb. 15, 2017  (WO) ............... PCT/CN2017/073680

(51) Int. Cl.
*H04L 1/00* (2006.01)
*H04L 5/00* (2006.01)
*H04W 88/08* (2009.01)

(52) U.S. Cl.
CPC ............. *H04L 1/001* (2013.01); *H04L 5/005* (2013.01); *H04W 88/08* (2013.01)

(58) Field of Classification Search
None
See application file for complete search history.

(56) References Cited

U.S. PATENT DOCUMENTS

| 8,588,150 B2 | 11/2013 | Luo et al. |
| 9,057,772 B1 | 6/2015 | Chavez et al. |

(Continued)

FOREIGN PATENT DOCUMENTS

| CN | 101248606 A | 8/2008 |
| CN | 101925056 A | 12/2010 |

(Continued)

OTHER PUBLICATIONS

"Coverage enhancement of PBCH for low cost MTC," 3GPP TSG RAN WG1 Meeting #75 R1-135103, San Francisco, USA, pp. 1-7, 3rd Generation Partnership Project Project, Valbonne, France (Nov. 11-15, 2013).

(Continued)

*Primary Examiner* — Phirin Sam
(74) *Attorney, Agent, or Firm* — Leydig, Voit & Mayer, Ltd.

(57) ABSTRACT

A message transmission method and device relating to the field of communications technologies are described that improve an anti-interference capability in message transmission. The method includes generating a scrambling code according to a scrambling code initialization seed, wherein the scrambling code initialization seed meets the following expression: $c_{init} = R \cdot 2^{a_7} + P \cdot (^{n_f}\!/\!\mathrm{mod}^k + 1) \cdot 2^{b_7}$ and then scrambling a message according to the scrambling code. The method further includes sending the scrambled message to a terminal on a physical downlink shared channel. Because the first time parameter has different values at at least two different moments, scrambling codes determined at the at least two corresponding different moments are different. Therefore, a possibility at which the base station uses a same scrambling code to scramble a same system message repeatedly in a time period is reduced, so that an anti-interference capability in system message transmission is improved.

20 Claims, 7 Drawing Sheets

Related U.S. Application Data continuation of application No. 16/507,866, filed on Jul. 10, 2019, now Pat. No. 11,101,916, which is a continuation of application No. PCT/CN2017/079375, filed on Apr. 1, 2017.

(56) References Cited

U.S. PATENT DOCUMENTS

| | | | |
|---|---|---|---|
| 11,101,916 B2 | 8/2021 | Ji et al. | |
| 2009/0052503 A1* | 2/2009 | Santoru | H04N 21/4405 375/148 |
| 2009/0303972 A1* | 12/2009 | Flammer, III | H04L 25/03866 370/338 |
| 2010/0034161 A1 | 2/2010 | Luo et al. | |
| 2011/0305237 A1 | 12/2011 | Luo et al. | |
| 2012/0039158 A1* | 2/2012 | Cheng | H04B 7/0671 370/203 |
| 2012/0250642 A1* | 10/2012 | Qu | H04W 24/10 370/329 |
| 2012/0257697 A1* | 10/2012 | Zhou | H04L 27/0014 375/346 |
| 2013/0064239 A1 | 3/2013 | Yu et al. | |
| 2014/0269847 A1 | 9/2014 | Chiu | |
| 2015/0078348 A1 | 3/2015 | Han et al. | |
| 2015/0312771 A1 | 10/2015 | Li | |
| 2015/0358998 A1 | 12/2015 | Golitschek Edler Von Elbwart et al. | |
| 2016/0014675 A1 | 1/2016 | Park et al. | |
| 2016/0065342 A1 | 3/2016 | Mirbagheri et al. | |
| 2016/0249306 A1 | 8/2016 | Luo et al. | |
| 2017/0078088 A1* | 3/2017 | Shanmugam | H04L 9/0861 |
| 2017/0126456 A1 | 5/2017 | Lee et al. | |
| 2017/0156133 A1 | 6/2017 | Xia et al. | |
| 2017/0257188 A1 | 9/2017 | Taniguchi et al. | |
| 2017/0285132 A1* | 10/2017 | Fischer | H04W 72/12 |
| 2017/0311285 A1 | 10/2017 | Ly et al. | |
| 2018/0027482 A1 | 1/2018 | Jin et al. | |
| 2018/0076992 A1 | 3/2018 | Nabetani et al. | |
| 2018/0176973 A1 | 6/2018 | Kim et al. | |
| 2019/0034672 A1* | 1/2019 | Rokhsaz | G06K 7/10158 |
| 2019/0150155 A1 | 5/2019 | Chatterjee | |

FOREIGN PATENT DOCUMENTS

| | | |
|---|---|---|
| CN | 102113403 A | 6/2011 |
| CN | 102271023 A | 12/2011 |
| CN | 103095625 A | 5/2013 |
| CN | 104104466 A | 10/2014 |
| CN | 104518843 A | 4/2015 |
| CN | 105453456 A | 3/2016 |
| CN | 103959874 B | 5/2019 |
| JP | 2010526470 A | 7/2010 |
| JP | 2014531152 A | 11/2014 |
| KR | 20090131621 A | 12/2009 |
| WO | 2016006903 A1 | 1/2016 |
| WO | 2016120949 A1 | 8/2016 |

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.1.0, pp. 1-175, 3rd Generation Partnership Project, Valbonne, France (Dec. 2016).

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.1.1, pp. 1-149, 3rd Generation Partnership Project, Valbonne, France (Jan. 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.1.0, pp. 1-414, 3rd Generation Partnership Project, Valbonne, France (Dec. 2016).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.0.0, pp. 1-644, 3rd Generation Partnership Project, Valbonne, France (Sep. 2016).

"PBCH coverage enhancement for low cost MTC," 3GPP TSG RAN WG1 Meeting #74bis, Guangzhou, China, R1-134129, XP050717319, pp. 1-4, 3rd Generation Partnership Project, Valbonne, France (Oct. 7-11, 2013).

Texas Instruments, "Modification on PRBS Initialization for DL RS," 3GPP TSG RAN WG1 53, Kansas City, MO, USA, R1-081993, total 4 pages, 3rd Generation Partnership Project, Valbonne, France (May 5-9, 2008).

* cited by examiner

MESSAGE TRANSMISSION METHOD AND DEVICE

CROSS-REFERENCE TO RELATED APPLICATIONS

This application is a continuation of U.S. patent application Ser. No. 17/317,530, filed on May 11, 2021, which is a continuation of U.S. patent application Ser. No. 16/507,866, filed on Jul. 10, 2019, now U.S. Pat. No. 11,101,916, which is a continuation of International Application No. PCT/CN2017/079375, filed on Apr. 1, 2017, which claims priority to International Application No. PCT/CN2017/070927, filed on Jan. 11, 2017, and International Application No. PCT/CN2017/073680, filed on Feb. 15, 2017. All of the aforementioned patent applications are hereby incorporated by reference in their entireties.

TECHNICAL FIELD

This application relates to the field of communications technologies, and in particular, to a message transmission method and device.

BACKGROUND

Currently, usually, a base station performs encoding and scrambling processing on a relatively important system message such as a MIB (master information block), then transmits the system message on a PBCH (physical broadcast channel), and transmits the system message in a broadcast manner.

For an anti-interference purpose, different scrambling codes need to be used for different cells, different terminals in a cell, or the like. A scrambling code is determined by the base station according to a scrambling code initialization seed, and the scrambling code initialization seed is determined according to a cell identity. A MIB is used as an example. A scrambling code initialization seed $c_{init}$ is determined according to a cell identity $N_{ID}^{cell}$; and specifically, $c_{init}=N_{ID}^{cell}$. Although generated scrambling codes are different because of different cell identities of base stations, the MIB is repeatedly transmitted within 80 ms in the prior art (for example, in an NB-IoT (narrowband internet of things)) to increase a success rate of receiving the MIB by a terminal. Specifically, the MIB is sent eight times within 80 ms, and is sent once every 10 ms. From a scrambling code seed generation formula $c_{init}=N_{ID}^{cell}$, it can be learned that the MIB is transmitted within the 80 ms by using a same scrambling code. Because scrambling mechanisms of the base stations are the same, it is possible that within a same 80 ms time period, a base station 1 scrambles its MIB by using a scrambling code 1, and then broadcasts the MIB; and a base station 2 scrambles its MIB by using a scrambling code 2, and then broadcasts the MIB. There is considerable interference between the scrambled MIB sent by the base station 1 and the scrambled MIB sent by the base station 2, and a difference between the scrambled MIB of the base station 1 and the scrambled MIB of the base station 2 in each repetition is the same as that in a next repetition. Therefore, within 80 ms, when receiving the scrambled MIB of the base station 1 every 10 ms, and then performing descrambling and in-phase combination on each repetition of the scrambled MIB of the base station 1, a terminal of the base station 1 also performs in-phase combination on the scrambled MIB (which may be considered as interference) of the base station 2. Consequently, interference power increases, affecting performance of MIB reception by the terminal. The base station 1 and the base station 2 are used as an example in the foregoing description. A same problem also exists between different cells of a same base station.

In addition, an NB-IoT system is used as an example. A base station transmits a SIB (system information block) 1 on a physical downlink shared channel. Usually, the base station needs to perform encoding and scrambling processing on the SIB 1 before sending the SIB 1. However, in the prior art, when scrambling a SIB 1, a base station first generates a scrambling code initialization seed $c_{init}$ and then generates a scrambling code according to the scrambling code initialization seed $c_{init}$. Specifically, for the SIB 1, the scrambling code initialization seed is $c_{init}=n_{RNTI} \cdot 2^{14}+(n_f \mod 2) \cdot 2^{13}+\lfloor n_s/2 \rfloor \cdot 2^9+N_{ID}^{Ncell}$, where $N_{ID}^{cell}$ is a cell identity, and the cell identity does not change during transmission of the SIB1; $n_f$ of is a radio frame number; although the radio frame number varies with time, ($n_f \mod 2$) remains unchanged because radio frames that carry the SIB1 are separated by an even quantity of radio frame numbers; $n_{RNTI}$ is an SI-RNTI (system information radio network temporary identifier), and is a constant value; and $n_s$ is a timeslot number, and the timeslot number is also fixed because the SIB 1 is always sent in a fixed subframe. Therefore, similar to the MIB, when base stations scramble the SIB 1 by using a same scrambling mechanism, interference during transmission of the SIB 1 increases, affecting performance of SIB 1 reception by a terminal.

SUMMARY

Embodiments of this application provide a message transmission method and device, so as to improve an anti-interference capability in message transmission.

According to a first aspect, a message sending method is provided, including: generating, by a base station, a scrambling code according to a first time parameter; then scrambling a system message according to the scrambling code; and finally sending the scrambled system message to a terminal on a physical broadcast channel.

It should be noted that the first time parameter has different values at at least two different moments in this embodiment of this application.

Because the first time parameter has different values at the at least two different moments, scrambling codes determined at the at least two corresponding different moments are different. Therefore, a possibility at which the base station uses a same scrambling code to scramble a same system message repeatedly in a time period is reduced, so that an anti-interference capability in system message transmission is improved.

Based on the first aspect, in a possible implementation, the first time parameter is a function of at least one of a radio frame number, a timeslot number, a hyper frame number, or a symbol number.

For example, the first time parameter is a function of the radio frame number. The radio frame number is a radio frame number in which a start position for sending the system message is located. Cases of the timeslot number, the hyper frame number, and the symbol number are similar to this.

Because the radio frame number, the timeslot number, the hyper frame number, or the symbol number of the system message varies with time, and the first time parameter is a function of at least one of the radio frame number, the timeslot number, the hyper frame number, or the symbol number, the first time parameter is also a physical quantity that varies with time. Therefore, the scrambling code determined according to the first time parameter also varies with time.

Based on the first aspect, in a possible implementation, the first time parameter is any one of a radio frame number, a timeslot number, a hyper frame number, and a symbol number; or the first time parameter is a value resulting from any one of a radio frame number, a timeslot number, a hyper frame number, and a symbol number modulo a first modulus, where the first modulus is a positive integer.

A benefit of doing so is that complexity of system message detection by the terminal is reduced. Because the terminal does not know all information about the radio frame number when detecting the scrambled system message, the terminal needs to perform blind detection.

For example, when the system message is a MIB, in an NB-IoT, the terminal may know, by using a synchronization message, a value resulting from the radio frame number modulo 8, and a minimum repetition period of the MIB is eight radio frames. Therefore, when the first modulus is 8, the terminal may be prevented from performing more blind detection operations on the radio frame number, and good anti-interference gains can be achieved. Therefore, in the NB-IoT, the first modulus may be set to 8 when the system message is a MIB.

Based on the first aspect, in a possible implementation, the first modulus is $2^n$, where n is a positive integer that is not equal to 3; or the first modulus is 8; or the first modulus is a prime number.

When the first modulus is a prime number, a better anti-interference capability in sending of the system message can be achieved by using a feature of the prime number.

Based on the first aspect, a possible implementation in which the base station generates the scrambling code according to the first time parameter is: The base station generates a scrambling code initialization seed according to the first time parameter and a first variable group, where the first variable group includes at least one of a cell identity, an RNTI, or a carrier identifier; and then generates the scrambling code according to the scrambling code initialization seed.

Based on the first aspect, another possible implementation in which the base station generates the scrambling code according to the first time parameter is: the base station generates a scrambling code initialization seed according to the first time parameter, and then generates the scrambling code according to the scrambling code initialization seed.

Based on the first aspect, an embodiment of this application further provides several possible implementations in which the base station generates the scrambling code initialization seed according to the first time parameter.

The first time parameter is the radio frame number $n_f$, and the initialization scrambling code seed $c_{init}$ meets the following expression: $c_{init}=n_f$; or the first time parameter is a value resulting from the radio frame number $n_f$ modulo the first modulus k, and the initialization scrambling code seed $c_{init}$ meets the following expression: $c_{init}=n_f \bmod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=N_{ID}^{cell} \cdot 2^{b_1})n_f$, where $a_1$ is a quantity of bits occupied by $N_{ID}^{cell}$ in $c_{init}$, and $b_1$ a quantity of bits occupied by $n_f$ in $c_{init}$; or the first time parameter is a value resulting from the radio frame number $n_f$ modulo the first modulus k, the first variable group includes the cell identity $N_{ID}^{cell}$, and the initialization scrambling code seed $c_{init}$ meets the following expression: $c_{init}=(n_f \bmod k) \cdot 2^{a_2}+N_{ID}^{Cell}$, or $c_{init}=N_{ID}^{Cell} \cdot 2^{b_2}+(n_f \bmod k)$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \bmod k)$ in $c_{init}$; or the first time parameter is a value resulting from the radio frame number $n_f$ (or the radio frame number plus an integer) modulo the first modulus k, the first variable group includes the cell identity $N_{ID}^{cell}$, and the initialization scrambling code seed $c_{init}$ meets the following expression: $c_{init}=[(n_f+h) \bmod k+w]^u \cdot P \cdot 2^{a_3}+Q$, or $c_{init}=[(n_f+h) \bmod k+w]^u \cdot P+Q \cdot 2^{b_3}$, where h is an integer, for example, h is equal to 0 or 1; k=8, k is a prime number, or k is a positive integer that is not 8 or a prime number; w is an integer, for example, w is equal to 0 or 1; u is a non-negative integer, for example, u may be 0, 1, 2, or 3; P is a function of the cell identity and/or the radio frame number, for example, P is equal to the cell identity $N_{ID}^{cell}$, or P is equal to $N_{ID}^{cell}+1$, or P is equal to $N_{ID}^{cell} \cdot (n_f \bmod k)^v$, where v is a positive integer; Q is a function of the cell identity, for example, is equal to the cell identity, or is equal to 0 (meaning that there is no parameter Q in the formula); $a_3$ is a non-negative integer, for example, $a_3$ is equal to a quantity of bits occupied by Q in $c_{init}$; and $b_3$ is a non-negative integer, for example, $b_3$ is equal to a quantity of bits occupied by $[(n_f+h) \bmod k+w]^u \cdot P$ in $c_{init}$.

Based on the first aspect, in a possible implementation, the scrambling may be bit-level scrambling. For example, modulo-2 addition may be performed on the scrambling code and to-be-scrambled information. The to-be-scrambled information may be a system message or a part of a system message, or may be an encoded system message or a part of an encoded system message.

Based on the first aspect, in another possible implementation, the scrambling may be symbol-level scrambling. For example, the base station may first map the scrambling code from a bit form to a symbol form. A mapping method is not limited. For example, BPSK or QPSK modulation or another similar mapping method may be performed. Then, the base station performs a pointwise multiplication operation, a pointwise conjugate multiplication operation, or the like on the scrambling code in the symbol form and to-be-scrambled information. The to-be-scrambled information may be a system message obtained after code modulation or a part of a system message obtained after code modulation.

According to a second aspect, a message receiving method is provided, including: determining, by a terminal, a first time parameter; receiving a scrambled system message on a physical broadcast channel; generating a scrambling code according to the first time parameter; and finally descrambling, by the terminal, the received scrambled system message according to the scrambling code.

Because the first time parameter has different values at at least two different moments in this embodiment of this application, scrambling codes used for system messages that are scrambled at the at least two corresponding different moments and that are received by the terminal may be different, so that performance of system message reception by the terminal is improved.

Based on the second aspect, in a possible implementation, the first time parameter is a function of at least one of a radio frame number, a timeslot number, a hyper frame number, or a symbol number.

For example, the first time parameter is a function of the radio frame number. The radio frame number is a radio frame number in which a start position for sending the system message is located. Cases of the timeslot number, the hyper frame number, and the symbol number are similar to this.

Because the radio frame number, the timeslot number, the hyper frame number, or the symbol number varies with time, and the first time parameter is a function of at least one of the radio frame number, the timeslot number, the hyper frame number, and or symbol number, the first time parameter is also a physical quantity that varies with time. Therefore, the scrambling code determined according to the first time parameter also varies with time.

Based on the second aspect, in a possible implementation, the first time parameter is any one of a radio frame number, a timeslot number, a hyper frame number, and a symbol number; or the first time parameter is a value resulting from any one of a radio frame number, a timeslot number, a hyper frame number, and a symbol number modulo a first modulus, where the first modulus is a positive integer.

A benefit of doing so is that complexity of system message detection by the terminal is reduced. Because the terminal does not know all information about the radio frame number when detecting the scrambled system message, the terminal needs to perform blind detection.

For example, when the system message is a MIB, in an NB-IoT, the terminal may know, by using a synchronization message, a value resulting from the radio frame number modulo 8, and a minimum repetition period of the MIB is eight radio frames. Therefore, when the first modulus is 8, the terminal may be prevented from performing more blind detection operations on the radio frame number, and good anti-interference gains can be achieved. Therefore, in the NB-IoT, the first modulus may be set to 8 when the system message is a MIB.

Based on the second aspect, in a possible implementation, the first modulus is $2^n$ where n is a positive integer that is not equal to 3; or the first modulus is 8; or the first modulus is a prime number.

When the first modulus is a prime number, a better anti-interference capability in sending of the system message can be achieved by using a feature of the prime number.

Based on the second aspect, a possible implementation in which the terminal generates the scrambling code according to the first time parameter is: the terminal generates a scrambling code initialization seed according to the first time parameter and a first variable group, where the first variable group includes at least one of a cell identity, an RNTI, or a carrier identifier; and then generates the scrambling code according to the scrambling code initialization seed.

Based on the second aspect, another possible implementation in which the terminal generates the scrambling code according to the first time parameter is: the terminal generates a scrambling code initialization seed according to the first time parameter, and then generates the scrambling code according to the scrambling code initialization seed.

Based on the second aspect, an embodiment of this application further provides several possible implementations in which the terminal generates the scrambling code initialization seed according to the first time parameter. The first time parameter is the radio frame number $n_f$, and the initialization scrambling code seed $c_{init}$ meets the following expression: $c_{init}=n_f$; or the first time parameter is a value resulting from the radio frame number of modulo the first modulus k, and the initialization scrambling code seed $c_{init}$ meets the following expression: $c_{init}=n_f \mod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=(N_{ID}^{cell} \cdot 2^{b_1})+n_f$, where $a_1$ is a quantity of bits occupied by $N_{ID}^{cell}$ in $c_{init}$, and $b_1$ is a quantity of bits occupied by $n_f$ in $c_{init}$; or the first time parameter is a value resulting from the radio frame number $n_f$ modulo the first modulus k, the first variable group includes the cell identity $N_{ID}^{cell}$, and the initialization scrambling code seed $c_{init}$ meets the following expression: $c_{init}=(n_f \mod k) \cdot 2^{a_2}+N_{ID}^{Cell}$, or $c_{init}=N_{ID}^{Cell} \cdot 2^{b_2}+(n_f \mod k)$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \mod k)$ in $cc_{init}$; or the first time parameter is a value resulting from the radio frame number $n_f$ (or the radio frame number plus an integer) modulo the first modulus k, the first variable group includes the cell identity $N_{ID}^{cell}$, and the initialization scrambling code seed $c_{init}$ meets the following expression: $c_{init}=[(n_f+h) \mod k)+]_u \cdot P \cdot 2^{a_3}+Q$, or $c_{init}=[(n_f+h) \mod k)+w]^u \cdot P+Q \cdot 2^{b_3}$, where h is an integer, for example, h is equal to 0 or 1; k=8, k is a prime number, or k is a positive integer that is not 8 or a prime number; w is an integer, for example, w is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell}+1$, or is equal to $N_{ID}^{cell} \cdot (n_f \mod k)^v$, where v is a positive integer; Q is a function of the cell identity, for example, is equal to the cell identity, or is equal to 0 (meaning that there is no parameter Q in the formula); $a_3$ is a non-negative integer, for example, $a_3$ is equal to a quantity of bits occupied by Q in $c_{init}$ and $b_3$ is a non-negative integer, for example, $b_3$ is equal to a quantity of bits occupied by $[(n_f+h) \mod k)+w]^u$ in $c_{init}$.

Based on the second aspect, in a possible implementation, the descrambling may be bit-level descrambling or symbol-level descrambling. A specific implementation method is corresponding to the scrambling step performed by the base station in the first aspect.

According to a third aspect, a message sending method is provided, including: generating, by a base station, a scrambling code according to a first parameter, where the first parameter includes a radio frame number or a value resulting from the radio frame number modulo a first modulus, and the first modulus is a positive integer greater than or equal to 3; scrambling a first message according to the scrambling code; and finally sending the scrambled first message to a terminal on a first channel; or generating, by a terminal, a scrambling code according to a first parameter, where the first parameter includes a radio frame number or a value resulting from the radio frame number modulo a first modulus, and the first modulus is a positive integer greater than or equal to 3; scrambling a first message according to the scrambling code; and finally sending the scrambled first message to a base station on a first channel.

The radio frame number in this embodiment of this application is a radio frame number in which a start position for sending the first message is located.

In this embodiment of this application, the radio frame number varies with time, and the scrambling code generated by the base station or the terminal is determined according to the first parameter. The first parameter includes the radio frame number or the value resulting from the radio frame number modulo the first modulus, and the first modulus is a positive integer greater than or equal to 3. Therefore, there are at least three different moments for the determined scrambling code, and scrambling codes determined by the base station or the terminal at the at least three different moments are different. The first message is scrambled according to the scrambling code. Therefore, an anti-interference capability in transmission of the first message is improved according to the technical solution of this embodiment of this application.

Based on the third aspect, in a possible implementation, the first message may be a system message, or may be a part of a system message. The first message may be an encoded system message, or the first message is a part of an encoded system message. The first channel is a physical downlink shared channel or a physical broadcast channel. In another possible implementation, the first message may be data information or control information, or may be a part of data information or control information. The first message may be encoded data information or control information, or the first message is a part of encoded data information or control information. The first channel is a physical downlink shared channel, a physical downlink control channel, a physical uplink shared channel, or a physical uplink control channel.

Based on the third aspect, in a possible implementation, in addition to either of the radio frame number or the value resulting from the radio frame number modulo the first modulus, the first parameter includes at least one of an RNTI, a timeslot number, a symbol number, a cell identity, or a carrier identifier.

Based on the third aspect, in a possible implementation, the first modulus is $2^n$; where n is a positive integer greater than 1; or the first modulus is a prime number greater than or equal to 3.

When the first modulus is a prime number, a better anti-interference capability in sending of the first message can be achieved by using a feature of the prime number.

Based on the third aspect, a possible implementation in which the base station or the terminal generates the scrambling code according to the first parameter is: the base station or the terminal generates a scrambling code initialization seed according to the first parameter; and then generates the scrambling code according to the scrambling code initialization seed.

Based on the third aspect, an embodiment of this application further provides several possible implementations in which the base station or the terminal generates the scrambling code initialization seed according to the first parameter.

The first parameter includes the value resulting from the radio frame number $n_f$ modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} \cdot 2^{a_1}+(n_f \mod k) \cdot 2^{b_1}+\lfloor n_s/2 \rfloor \cdot 2^{c_1}+N_{ID}^{Ncell}$, where $a_1$ is a sum of quantities of bits occupied by $(n_f \mod k)$, $\lfloor n_s/2 \rfloor$, and $N_{ID}^{Ncell}$ in $c_{init}$, $b_1$ is a sum of quantities of bits occupied by $\lfloor n_s/2 \rfloor$ and $N_{ID}^{Ncell}$ in $c_{init}$, and $c_1$ is a quantity of bits occupied by $N_{ID}^{Ncell}$ in $c_{init}$; or the first parameter includes the radio frame number $n_f$, the timeslot number $n_s$, and the cell identity $N_{ID}^{Ncell}$, and the scrambling code initialization seed $c_{init}$ meets the following expression: $c_{init}=n_f \cdot 2^{b_2}+\lfloor n_s/2 \rfloor \cdot 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \mod k) \cdot 2^{b_3}+\lfloor n_s/2 \rfloor \cdot 2^{c_3} N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI} 2^{a_4}+(n_f \mod k) \cdot 2^{b_4}+N_{ID}^{Ncell}$, where $a_4$ is a sum of quantities of bits occupied by $(n_f \mod k)$ and $N_{ID}^{Ncell}$ in $c_{init}$, and $b_4$ is a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \mod k) \cdot 2^{b_5}+N_{ID}^{Ncell}$, where $b_5$ is a quantity of bits occupied by $N_{ID}^{Ncell}$ in $c_{init}$; or the first parameter includes the radio frame number $n_f$ and the cell identity $N_{ID}^{Ncell}$, and the scrambling code initialization seed $c_{init}$ meets the following expression: $c_{init}=n_f \cdot 2^{b_6}+N_{ID}^{Ncell}$, where $b_6$ is a quantity of bits occupied by $N_{ID}^{Ncell}$ in $c_{init}$; or the first parameter includes at least one of the radio network temporary identifier $n_{RNTI}$, the value resulting from the radio frame number $n_f$ modulo the first modulus k, the timeslot number $n_s$, or the cell identity $N_{ID}^{Ncell}$, and the initialization scrambling code seed $c_{init}$ meets the following expression: $c_{init}=R \cdot 2^{a_7}+\lfloor (n_f+h) \mod k)+w \rfloor^u \cdot P \cdot 2^{b_7}+H \cdot 2^{c_7}+Q$, where R is a function of the radio network temporary identifier, for example, is equal to the radio network temporary identifier $n_{RNTI}$, or is equal to 0 (meaning that there is no parameter R in the formula); h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell}+1$, or is equal to $N_{ID}^{cell} \cdot (n_f \mod k)^v$, where v is a positive integer; H is a function of the timeslot number, for example, is equal to the timeslot number $n_s$, or is equal to 0 (meaning that there is no parameter H in the formula); Q is a function of the cell identity, for example, is equal to the cell identity, or is equal to 0 (meaning that there is no parameter Q in the formula); $a_7$ is a non-negative integer, for example, $a_7$ is equal to a sum of quantities of bits occupied by $[(n_f+h) \mod k)+w]^u \cdot P$, H and Q in $c_{init}$; $b_7$ is a non-negative integer, for example, $b_3$ is equal to a sum of quantities of bits occupied by H and Q in $c_{init}$; and $c_7$ is a non-negative integer, for example, is equal to a quantity of bits occupied by Q in $c_{init}$; or the first parameter includes at least one of the radio network temporary identifier $n_{RNTI}$ the radio frame number $n_f$, the timeslot number $n_s$, or the cell identity $N_{ID}^{Ncell}$, and the initialization scrambling code seed $c_{init}$ meets the following expression:

$$c_{init}=(k_0 N_{ID}^{Ncell}+k_1)(k_2 n_f+k_3 \lfloor n_s/2 \rfloor + k_4)^{u_1} \cdot 2^{a_8} k_5 N_{ID}^{Ncell}+k_6; \text{ or}$$

$$c_{init}=k_{18} n_{RNTI} \cdot 2^{b_8}+(k_7 N_{ID}^{Ncell}+k_8)(k_9 n_{RNTI}+k_{10}) [(k_{11} n_f+k_{12} \lfloor n_s/2 \rfloor + k_{13}) \mod k_{14}+k_{15}]^{u_2} \cdot 2^{c_8}+ k_{16} N_{ID}^{Ncell}+k_{17}; \text{ or}$$

$$c_{init}=(k_{19} N_{ID}^{Ncell}+k_{20})(k_{21} n_f+k_{22})^{u_3}(k_{23} \lfloor n_s/2 \rfloor + k_{24})^{u_4} \cdot 2^{d_8}+k_{25} N_{ID}^{cell}+k_{26}; \text{ or}$$

$$c_{init}=k_{27} n_{RNTI} \cdot 2^{e_8}+(k_{28} N_{ID}^{Ncell}+k_{29})(k_{30} n_{RNTI}+k_{31}) [(k_{32} n_f+k_{33}) \mod k_{34}+k_{35}]^{u_5} (k_{36} \lfloor n_s/2 \rfloor + k_{37})^{u_6} \cdot 2^{f_8} k_{38} N_{ID}^{Ncell}+k_{39};$$

where $k_0, k_1, \ldots,$ and $k_{39}$ are non-negative integers; $a_8, b_8, c_8, d_8, e_8,$ and $f_8$ are non-negative integers; and $u_1, u_2, \ldots,$ and $u_6$ are non-negative integers. For example, in a possible implementation method, $k_0$ is equal to 1, $k_1$ is equal to 0 or 1, $k_2$ is equal to 10, $k_3$ is equal to 1, $k_4$ is equal to 0 or 1, $u_1$ is equal to 1 or 2, $a_8$ is equal to 0 or 9, $k_5$ is equal to 0 or 1, and $k_6$ is 6 equal to 0 or 1. In a possible implementation method, $k_{18}$ is equal to 0 or 1, $b_8$ is a non-negative integer, $k_7$ is equal to 1, $k_8$ is equal to 0 or 1, $k_9$ equal to 0 or 1, $k_{10}$ is equal to 0 or 1, $k_{11}$ is equal to 10, $k_{12}$ is equal to 1, $k_{13}$ is equal to 0 or 1, $k_{14}$ is a prime number or an integer power of 2, $k_{15}$ is equal to 0 or 1, $u_2$ is equal to 1 or 2, $c_8$ is equal to 0 or 9, $k_{16}$ is equal to 0 or 1, and $k_{17}$ is equal to 0 or 1. In a possible implementation method, $k_{19}$ is equal to 1, $k^{20}$ is equal to 0 or 1, $k_{21}$ is equal to 1, $k_{22}$ is equal to 0 or 1, $u_3$ is equal to 1 or 2, $k_{23}$ is equal to 1, $k_{24}$ is equal to 0 or 1, $u_4$ is equal to 1 or 2, $d_8$ is equal to 0 or 9, $k_{25}$ is equal to 0 or 1, and $k_{26}$ is equal to 0 or 1. In a possible implementation method, $k_{27}$ is equal to 0 or 1, $e_8$ is a non-negative integer, $k_{28}$ is equal to 1, $k_{29}$ is equal to 0 or 1, $k_{30}$ is equal to 0 or 1, $k_{31}$ equal to 0 or 1, $k_{32}$ is equal to 1, $k_{33}$ is equal to 0 or 1, $k_{34}$ is a prime number or an integer power of 2, $k_{35}$ is equal to 0 or 1, $u_5$ is equal to 1 or 2, $k_{36}$ is equal to 1, $k_{37}$ is equal to 0 or 1, $u_6$ is equal to 1 or 2, $f_8$ is equal to 0 or 9, $k_{38}$ is equal to 0 or 1, and $k_{39}$ is equal to 0 or 1.

It should be noted that the first parameter may further include at least one of the symbol number, the hyper frame number, or the carrier identifier. In this embodiment of this application, the RNTI, the timeslot number, the symbol number, the hyper frame number, the cell identity, the carrier identifier, and the like may all participate in the determining of the scrambling code initialization seed by using values resulting from them modulo the modulus. In addition, in this embodiment of this application, higher bits and lower bits in the bits occupied in $c_{init}$ by the variables: the radio frame number $n_f$, the value resulting from the radio frame number $n_f$ modulo the first modulus k, the radio network temporary identifier $n_{RNTI}$, the timeslot number $n_s$, and the cell identity $N_{ID}^{Ncell}$ may be interchanged. This is not limited in this embodiment of this application.

Based on the third aspect, the base station sends, to the terminal, indication information used to indicate a manner of scrambling a first channel/first information.

Specifically, a possible implementation of the indication information used to indicate the manner of scrambling the first channel/first information is: The indication information may be used to indicate a manner of determining a scrambling code initialization seed of the first channel/first information and/or a scrambling code initialization method.

Specifically, the scrambling code initialization method includes at least one of a scrambling code length or a scrambling code initialization frequency/period.

The indication information may be located in a system message (a MIB or a SIB), and be sent by the base station to the terminal by using a PBCH or a PDSCH.

Based on the third aspect, the terminal reports terminal indication information to the base station, where the terminal indication information is used to indicate a scrambling manner support capability of the terminal.

In a communications system, a scrambling manner is usually characterized by incapability of full backward compatibility. Therefore, the terminal reports the scrambling manner support capability of the terminal, so that the base station can use a proper scrambling manner on data sent by the base station to the terminal, and the base station can also receive, in a correct scrambling manner, data sent by the terminal to the base station.

In a possible implementation method, the scrambling manner support capability of the terminal includes at least one of a quantity of scrambling manners supported by the terminal and whether the terminal supports or uses a scrambling manner. For example, the communications system supports two scrambling manners. A scrambling manner 1 is bit-level scrambling, in which a scrambling code is generated by using a scrambling code seed generation formula 1. A scrambling manner 2 is symbol-level scrambling, in which a scrambling code is generated by using a scrambling code seed generation formula 2. The terminal indication information may be used to indicate whether the terminal supports one scrambling manner or supports both of the two scrambling manners, and/or the terminal indication information may be used to indicate whether the terminal supports the scrambling manner 1 or 2.

In a possible implementation method, the terminal may report the terminal indication information to the base station by using RRC signaling or other higher layer signaling.

According to a fourth aspect, a message receiving method is provided, including: determining, by a terminal, a first parameter, where the first parameter includes a radio frame number or a value resulting from the radio frame number modulo a first modulus, and the first modulus is a positive integer greater than or equal to 3; receiving a scrambled first message on a first channel; generating a scrambling code according to the first parameter; and finally descrambling the received scrambled first message according to the scrambling code; or determining, by a base station, a first parameter, where the first parameter includes a radio frame number or a value resulting from the radio frame number modulo a first modulus, and the first modulus is a positive integer greater than or equal to 3; receiving a scrambled first message on a first channel; generating a scrambling code according to the first parameter; and finally descrambling the received scrambled first message according to the scrambling code.

Because the radio frame number or the value resulting from the radio frame number modulo the first modulus has different values at at least two different moments in this embodiment of this application, where the radio frame number and the value are included in the first parameter, scrambling codes used for first messages that are scrambled at the at least two corresponding different moments and that are received by the terminal or the base station may be different, so that performance of system message reception by the terminal is improved.

Based on the fourth aspect, in a possible implementation, the first message may be a system message, or may be a part of a system message. The first message may be an encoded system message, or the first message is a part of an encoded system message. The first channel is a physical downlink shared channel or a physical broadcast channel. In another possible implementation, the first message may be data information or control information, or may be a part of data information or control information. The first message may be encoded data information or control information, or the first message is a part of encoded data information or control information. The first channel is a physical downlink shared channel, a physical downlink control channel, a physical uplink shared channel, or a physical uplink control channel.

Based on the fourth aspect, in a possible implementation, in addition to either of the radio frame number or the value resulting from the radio frame number modulo the first modulus, the first parameter includes at least one of an RNTI, a timeslot number, a symbol number, a cell identity, or a carrier identifier.

Based on the fourth aspect, in a possible implementation, the first modulus is $2^n$ where n is a positive integer greater than 1; or the first modulus is a prime number greater than or equal to 3.

When the first modulus is a prime number, a better anti-interference capability in sending of the first message can be achieved by using a feature of the prime number.

Based on the fourth aspect, a possible implementation in which the terminal or the base station generates the scrambling code according to the first parameter is: the terminal or the base station generates a scrambling code initialization seed according to the first parameter; and then generates the scrambling code according to the scrambling code initialization seed.

Based on the fourth aspect, an embodiment of this application further provides several possible implementations in which the terminal or the base station generates the scrambling code initialization seed according to the first parameter.

The first parameter includes the value resulting from the radio frame number $n_f$ modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} 2^{a_1}+(n_f \bmod k) \cdot 2^{b_1}+\lfloor n_s/2 \rfloor \cdot 2^{c_1}+N_{ID}^{Ncell}$, where $a_1$ is a sum of quantities of bits occupied by ($n_f \bmod k$), $\lfloor n_s/2 \rfloor$, and $N_{ID}^{Ncell}$ in $c_{init}$, $b_1$ is a sum of quantities of bits occupied by $\lfloor n_s/2 \rfloor$ and $N_{ID}^{Ncell}$ in and $c_{init}$, and $c_1$ is a quantity of bits occupied by $N_{ID}^{Ncell}$ in $c_{init}$; or the first parameter includes the radio frame number $n_f$ the timeslot number $n_s$, and the cell identity $N_{ID}^{Ncell}$, and the scrambling code initialization seed $c_{init}$ meets the following expression: $c_{init}=n_f 2^{b_2}+\lfloor n_s/2 \rfloor \cdot 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \bmod k) \cdot 2^{b_3}+\lfloor n_s/2 \rfloor \cdot 2^{c_3}+N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI} 2^{a_4}+(n_f \bmod k) \cdot 2^{b_4}+N_{ID}^{Ncell}$, where $a_4$ is a sum of quantities of bits occupied by ($n_f \bmod k$) and $N_{ID}^{Ncell}$ in $c_{init}$, and $b_4$ is a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \bmod k) \cdot 2^{b_5}+N_{ID}^{Ncell}$, where $b_5$ is a quantity of bits occupied by $N_{ID}^{Ncell}$ in $c_{init}$; or the first parameter includes the radio frame number $n_f$ and the cell identity $N_{ID}^{Ncell}$, and the scrambling code initialization seed $c_{init}$ meets the following expression: $c_{init}=n_f 2^{b_6}+N_{ID}^{Ncell}$, where $b_6$ is a quantity of bits occupied by $N_{ID}^{Ncell}$ in $c_{init}$; or the first parameter includes at least one of the radio network temporary identifier $n_{RNTI}$, the value resulting from the radio frame number $n_f$ modulo the first modulus k, the timeslot number $n_s$, or the cell identity $N_{ID}^{Ncell}$, and the initialization scrambling code seed $c_{init}$ meets the following expression: $c_{init}=R \cdot 2^{a_1}+[(n_f+h) \bmod k)+w]^u \cdot P \cdot 2^{b_1}+H \cdot 2^{c_1}+Q$, where R is a function of the radio network temporary identifier, for example, is equal to the radio network temporary identifier $n_{RNTI}$ or is equal to 0 (meaning that there is no parameter R in the formula); h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell}+1$, or is equal to $N_{ID}^{cell} \cdot (n_f \bmod k)^v$, where v is a positive integer; H is a function of the timeslot number, for example, is equal to the timeslot number $n_s$, or is equal to 0 (meaning that there is no parameter H in the formula); Q is a function of the cell identity, for example, is equal to the cell identity, or is equal to 0 (meaning that there is no parameter Q in the formula); $a_7$ is a non-negative integer, for example, is equal to a sum of quantities of bits occupied by $[(n_f+h) \bmod k)+w]^u \cdot P$, H, and Q in $c_{init}$; $b_7$ is a non-negative integer, for example, is equal to a sum of quantities of bits occupied by H and Q in $c_{init}$; and $c_7$ is a non-negative integer, for example, is equal to a quantity of bits occupied by Q in $c_{init}$; or the first parameter includes at least one of the radio network temporary identifier $n_{RNTI}$ the radio frame number $n_f$, the timeslot number $n_s$, or the cell identity $N_{ID}^{Ncell}$, and the initialization scrambling code seed $c_{init}$ meets the following expression:

$$c_{init}=(k_0 N_{ID}^{Ncell}+k_1)(k_2 n_f+k_3 \lfloor n_s/2 \rfloor+k_4)^{u_1} \cdot 2^{a_8}+k_5 N_{ID}^{Ncell}+k_6; \text{ or}$$

$$c_{init}=k_{18} n_{RNTI} 2^{b_8}+(k_7 N_{ID}^{Ncell}+k_8)(k_9 n_{RNTI}+k_{10})[(k_{11} n_f+k_{12} \lfloor n_s/2 \rfloor+k_{13}) \bmod k_{14}+k_{15}]^{u_2} 2^{c_8}+k_{16} N_{ID}^{Ncell}+k_{17}; \text{ or}$$

$$c_{init}=(k_{19} N_{ID}^{Ncell}+k_{20})(k_{21} n_f+k_{22})^{u_3}(k_{23} \lfloor n_s/2 \rfloor+k_{24})^{u_4} \cdot 2^{d_8}+k_{25} N_{ID}^{Ncell}+k_{26}; \text{ or}$$

$$c_{init}=k_{27} n_{RNTI} 2^{e_8}+(k_{28} N_{ID}^{Ncell}+k_{29})(k_{30} n_{RNTI}+k_{31})[(k_{32} n_f+k_{33}) \bmod k_{34}+k_{35}]^{u_5}(k_{36} \lfloor n_s/2 \rfloor+k_{37})^{u_6} \cdot 2^{f_8}+k_{38} N_{ID}^{Ncell}+k_{39};$$

where $k_0, k_1, \ldots,$ and $k_{39}$ are non-negative integers; $a_8, b_8, c_8, d_8, e_8,$ and $f_8$ are non-negative integers; and $u_1, u_2, \ldots,$ and $u_6$ are non-negative integers. For example, in a possible implementation method, $k_0$ is equal to 1, $k_1$ is equal to 0 or 1, $k_2$ is equal to 10, $k_3$ is equal to 1, $k_4$ is equal to 0 or 1, $u_1$ is equal to 1 or 2, $a_8$ is equal to 0 or 9, $k_5$ is equal to 0 or 1, and $k_6$ is equal to 0 or 1. In a possible implementation method, $k_{18}$ is equal to 0 or 1, $b_8$ is a non-negative integer, $k_7$ is equal to 1, $k_8$ is equal to 0 or 1, $k_9$ is equal to 0 or 1, $k_{10}$ is equal to 0 or 1, $k_{11}$ is equal to 10, $k_{12}$ is equal to 1, $k_{13}$ is equal to 0 or 1, $k_{14}$ is a prime number or an integer power of 2, $k_{15}$ is equal to 0 or 1, $u_2$ is equal to 1 or 2, $c_8$ is equal to 0 or 9, $k_{16}$ is equal to 0 or 1, and $k_{17}$ is equal to 0 or 1. In a possible implementation method, $k_{19}$ equal to 1, $k_{20}$ is equal to 0 or 1, $k_{21}$ is equal to 1, $k_{22}$ is equal to 0 or 1, $u_3$ is equal to 1 or 2, $k_{23}$ is equal to 1, $k_{24}$ is equal to 0 or 1, $u_4$ is equal to 1 or 2, $d_8$ is equal to 0 or 9, $k_{25}$ is equal to 0 or 1, and $k_{26}$ is equal to 0 or 1. In a possible implementation method, $k_{27}$ is equal to 0 or 1, $e_8$ is a non-negative integer, $k_{28}$ is equal to 1, $k_{29}$ is equal to 0 or 1, $k_{30}$ is equal to 0 or 1, $k_{31}$ is equal to 0 or 1, $k_{32}$ is equal to 1, $k_{33}$ is equal to 0 or 1, $k_{34}$ is a prime number or an integer power of 2, $k_{35}$ is equal to 0 or 1, $u_5$ is equal to 1 or 2, $k_{36}$ is equal to 1, $k_{37}$ is equal to 0 or 1, $u_6$ is equal to 1 or 2, $f_8$ is equal to 0 or 9, $k_{38}$ is equal to 0 or 1, and $k_{39}$ is equal to 0 or 1.

It should be noted that the first parameter may further include at least one of the symbol number, the hyper frame number, or the carrier identifier. In this embodiment of this application, the RNTI, the timeslot number, the symbol number, the hyper frame number, the cell identity, the carrier identifier, and the like may all participate in the determining of the scrambling code initialization seed by using values resulting from them modulo the modulus. In addition, in this embodiment of this application, higher bits and lower bits in the bits occupied in $c_{init}$ by the variables: the radio frame number $n_f$, the value resulting from the radio frame number $n_f$ modulo the first modulus k, the radio network temporary identifier $n_{RNTI}$, the timeslot number $n_s$, and the cell identity $N_{ID}^{Ncell}$ may be interchanged. This is not limited in this embodiment of this application.

According to a fifth aspect, a base station is provided, including a processing module and a sending module, where the processing module is configured to: generate a scrambling code according to a first time parameter, and scramble a system message according to the scrambling code; and the sending module is configured to send, to a terminal on a physical broadcast channel, the system message scrambled by the processing module.

Based on the fifth aspect, in a possible implementation, the first time parameter is a function of at least one of a radio frame number, a timeslot number, a hyper frame number, or a symbol number.

Based on the fifth aspect, in a possible implementation, the first time parameter is any one of a radio frame number, a timeslot number, a hyper frame number, and a symbol number; or the first time parameter is a value resulting from any one of a radio frame number, a timeslot number, a hyper frame number, and a symbol number modulo a first modulus, where the first modulus is a positive integer.

Based on the fifth aspect, in a possible implementation, the first modulus is $2^n$, where n is a positive integer that is not equal to 3; or the first modulus is 8; or the first modulus is a prime number.

Based on the fifth aspect, a possible implementation in which the processing module generates the scrambling code according to the first time parameter is: generating a scrambling code initialization seed according to the first time parameter and a first variable group, and generating the scrambling code according to the scrambling code initialization seed, where the first variable group includes at least one of a cell identity, a radio network temporary identifier RNTI, or a carrier identifier.

Based on the fifth aspect, another possible implementation in which the processing module generates the scrambling code according to the first time parameter is: generating a scrambling code initialization seed according to the first time parameter, and generating the scrambling code according to the scrambling code initialization seed.

Based on the fifth aspect, an embodiment of this application further provides several possible implementations in which the base station generates the scrambling code initialization seed according to the first time parameter.

The first time parameter is the radio frame number $n_f$, and the initialization scrambling code seed $c_{init}$ meets the following expression: $c_{init}=n_f$; or the first time parameter is a value resulting from the radio frame number $n_f$ modulo the first modulus k, and the initialization scrambling code seed $c_{init}$ meets the following expression: $c_{init}=n_f \mod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=(N_{ID}^{cell} \cdot 2^{b_1})+n_f$, where $a_1$ is a quantity of bits occupied by $N_{ID}^{cell}$ in $c_{init}$, and $b_1$ is a quantity of bits occupied by $n_f$ in $c_{init}$; or the first time parameter is a value resulting from the radio frame number $n_f$ modulo the first modulus k, the first variable group includes the cell identity $N_{ID}^{cell}$, and the initialization scrambling code seed $c_{init}$ meets the following expression: $c_{init}=(n_f \mod k) \cdot 2^{a_2}+N_{ID}^{Cell}$, or $c_{init}=N_{ID}^{Cell} \cdot 2^{b_2}+(n_f \mod k)$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \mod k)$ in $c_{init}$; or the first time parameter is a value resulting from the radio frame number $n_f$ (or the radio frame number plus an integer) modulo the first modulus k, the first variable group includes the cell identity $N_{ID}^{cell}$, and the initialization scrambling code seed $c_{init}$ meets the following expression: $c_{init}=[(n_f+h) \mod k)+w]^u \cdot P \cdot 2^{a_3}+Q$, or $c_{init}=[(n_f+h) \mod k)+w]^u \cdot P+Q \cdot 2^{b_3}$, where h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity ID, or is equal to $N_{ID}^{cell} \cdot (n_f \mod k)^v$, where v is a positive integer; Q is a function of the cell identity, for example, is equal to the cell identity, or is equal to 0 (meaning that there is no parameter Q in the formula); $a_3$ is a non-negative integer, for example, is equal to a quantity of bits occupied by Q in $c_{init}$; and $b_3$ is a non-negative integer, for example, is equal to a quantity of bits occupied by $[(n_f+h) \mod k)+w]^u \cdot P$ in $c_{init}$.

Based on the fifth aspect, in a possible implementation, the scrambling may be bit-level scrambling. For example, modulo-2 addition may be performed on the scrambling code and to-be-scrambled information. The to-be-scrambled information may be a system message or a part of a system message, or may be an encoded system message or a part of an encoded system message.

Based on the fifth aspect, in another possible implementation, the scrambling may be symbol-level scrambling. For example, the base station may first map the scrambling code from a bit form to a symbol form. A mapping method is not limited. For example, BPSK or QPSK modulation or another similar mapping method may be performed. Then, the base station performs a pointwise multiplication operation, a pointwise conjugate multiplication operation, or the like on the scrambling code in the symbol form and to-be-scrambled information. The to-be-scrambled information may be a system message obtained after code modulation or a part of a system message obtained after code modulation.

According to a sixth aspect, a terminal is provided, including a processing module and a receiving module, where the processing module is configured to determine a first time parameter; the receiving module is configured to receive a scrambled system message on a physical broadcast channel; and the processing module is further configured to: generate a scrambling code according to the first time parameter; and descramble, according to the scrambling code, the received system message scrambled by the processing module.

Based on the sixth aspect, in a possible implementation, the first time parameter is a function of at least one of a radio frame number, a timeslot number, a hyper frame number, or a symbol number.

Based on the sixth aspect, in a possible implementation, the first time parameter is any one of a radio frame number, a timeslot number, a hyper frame number, and a symbol number; or the first time parameter is a value resulting from any one of a radio frame number, a timeslot number, a hyper frame number, and a symbol number modulo a first modulus, where the first modulus is a positive integer.

Based on the sixth aspect, in a possible implementation, the first modulus is $2^n$, where n is a positive integer that is not equal to 3; or the first modulus is 8; or the first modulus is a prime number.

Based on the sixth aspect, a possible implementation in which the processing module generates the scrambling code according to the first time parameter is: generating a scrambling code initialization seed according to the first time parameter and a first variable group, and generating the scrambling code according to the scrambling code initialization seed, where the first variable group includes at least one of a cell identity, a radio network temporary identifier RNTI, or a carrier identifier.

Based on the sixth aspect, another possible implementation in which the processing module generates the scrambling code according to the first time parameter is: generating a scrambling code initialization seed according to the first time parameter, and generating the scrambling code according to the scrambling code initialization seed.

Based on the sixth aspect, an embodiment of this application further provides several possible implementations in which the processing module generates the scrambling code initialization seed according to the first time parameter.

The first time parameter is the radio frame number $n_f$, and the initialization scrambling code seed $c_{init}$ meets the following expression: $c_{init}=n_f$; or the first time parameter is a value resulting from the radio frame number $n_f$ modulo the first modulus k, and the initialization scrambling code seed $c_{init}$ meets the following expression: $c_{init}=n_f \bmod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=(N_{ID}^{cell} \cdot 2^{b_1})+n_f$, where $a_1$ is a quantity of bits occupied by $N_{ID}^{cell}$ in $c_{init}$, and $b_1$ is a quantity of bits occupied by $n_f$ in $c_{init}$; or the first time parameter is a value resulting from the radio frame number $n_f$ modulo the first modulus k, the first variable group includes the cell identity $N_{ID}^{cell}$, and the initialization scrambling code seed $c_{init}$ meets the following expression: $c_{init}=(n_f \bmod k) \cdot 2^{a_2}+N_{ID}^{Cell}$, or $c_{init}=N_{ID}^{Cell} \cdot 2^{b_2}+(n_f \bmod k)$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \bmod k)$ in $c_{init}$; or the first time parameter is a value resulting from the radio frame number $n_f$ (or the radio frame number plus an integer) modulo the first modulus k, the first variable group includes the cell identity $N_{ID}^{cell}$, and the initialization scrambling code seed $c_{init}$ meets the following expression: $c_{init}=[(n_f+h) \bmod k)+w]^u \cdot P \cdot 2^{a_3}+Q$, or $c_{init}=[(n_f+h) \bmod k)+w]^u \cdot P+Q \cdot 2^{b_3}$ where h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell} \cdot (n_f \bmod k)^v$, where v is a positive integer; Q is a function of the cell identity, for example, is equal to the cell identity, or is equal to 0 (meaning that there is no parameter Q in the formula); $a_3$ is a non-negative integer, for example, is equal to a quantity of bits occupied by Q in $c_{init}$; and $b_3$ is a non-negative integer, for example, is equal to a quantity of bits occupied by $[(n_f+h) \bmod k)+w]^u \cdot P$ in $c_{init}$.

Based on the sixth aspect, in a possible implementation, the descrambling may be bit-level descrambling or symbol-level descrambling. A specific implementation method is corresponding to the scrambling step performed by the base station in the fifth aspect.

According to a seventh aspect, a communications system is provided, including any base station provided in the fifth aspect and the terminal provided in the sixth aspect.

According to an eighth aspect, a base station or a terminal is provided, including a processing module and a sending module, where the processing module is configured to: generate a scrambling code according to a first parameter, and scramble a first message according to the scrambling code, where the first parameter includes a radio frame number or a value resulting from the radio frame number modulo a first modulus, and the first modulus is a positive integer greater than or equal to 3; and the sending module is configured to send, to the terminal or the base station on a first channel, the first message scrambled by the processing module.

Based on the eighth aspect, in a possible implementation, the first message is a system message, or the first message is a part of a system message; or the first message is an encoded system message, or the first message is a part of an encoded system message. The first channel is a physical downlink shared channel or a physical broadcast channel. In another possible implementation, the first message may be data information or control information, or may be a part of data information or control information. The first message may be encoded data information or control information, or the first message is a part of encoded data information or control information. The first channel is a physical downlink shared channel, a physical downlink control channel, a physical uplink shared channel, or a physical uplink control channel.

Based on the eighth aspect, in a possible implementation, in addition to the radio frame number or the value resulting from the radio frame number modulo the first modulus, the first parameter includes at least one of a radio network temporary identifier RNTI, a timeslot number, a symbol number, a cell identity, or a carrier identifier.

Based on the eighth aspect, in a possible implementation, the first modulus is $2^n$, where n is a positive integer greater than 1; or the first modulus is a prime number greater than or equal to 3.

Based on the eighth aspect, a possible implementation in which the processing module generates the scrambling code according to the first parameter is: generating a scrambling code initialization seed according to the first parameter, and generating the scrambling code according to the scrambling code initialization seed.

Based on the eighth aspect, an embodiment of this application further provides several possible implementations in which the processing module generates the scrambling code initialization seed according to the first time parameter.

The first parameter includes the value resulting from the radio frame number $b_f$ modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} \cdot 2^{a_1}+(n_f \bmod k) \cdot 2^{b_1}+\lfloor n_s/2 \rfloor \cdot 2^{c_1}+N_{ID}^{Ncell}$, where $a_1$ is a sum of quantities of bits occupied by $(n_f \bmod k)$, $\lfloor n_s/2 \rfloor$, and $N_{ID}^{Ncell}$ in $c_{init}$, $b_1$ is a sum of quantities of bits occupied by $\lfloor n_s/2 \rfloor$ and $N_{ID}^{Ncell}$ in $c_{init}$, and $c_1$ is a quantity of bits occupied by $N_{ID}^{Ncell}$ in $c_{init}$; or the first parameter includes the radio frame number $n_f$, the timeslot number $n_s$, and the cell identity $N_{ID}^{Ncell}$, and the scrambling code initialization seed $c_{init}$ meets the following expression: $c_{init}=n_f 2^{b_2}+\lfloor n_s/2 \rfloor 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \bmod k) \cdot 2^{b_3}+\lfloor n_s/2 \rfloor \cdot 2^{c_3}+N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI} \cdot 2^{a_4}+(n_f \bmod k) \cdot 2^{b_4}+N_{ID}^{Ncell}$, where $a_4$ is a sum of quantities of bits occupied by $(n_f \bmod k)$ and $N_{ID}^{Ncell}$ in $c_{init}$, and $b_4$ a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \bmod k) \cdot 2^{b_5}+N_{ID}^{Ncell}$, where $b_5$ is a quantity of bits occupied by $N_{ID}^{Ncell}$ in $c_{init}$; or the first parameter includes the radio frame number $n_f$ and the cell identity $N_{ID}^{Ncell}$, and the scrambling code initialization seed $c_{init}$ meets the following expression: $c_{init}=n_f \cdot 2^{b_6}+N_{ID}^{Ncell}$, where $b_6$ is a quantity of bits occupied by $N_{ID}^{Ncell}$ in $c_{init}$; or the first parameter includes at least one of the radio network temporary identifier $n_{RNTI}$ the value resulting from the radio frame number $n_f$ modulo the first modulus k, the timeslot number $n_s$, or the cell identity $N_{ID}^{Ncell}$, and the initialization scrambling code seed $c_{init}$ meets the following expression: $c_{init}=R \cdot 2^{a_7}+[(n_f+h) \bmod k)+w]^u \cdot P \cdot 2^{b_7}+H \cdot 2^{c_7}+Q$, where R is a function of the radio network temporary identifier, for example, is equal to the radio network temporary identifier $n_{RNTI}$ or is equal to 0 (meaning that there is no parameter R in the formula); h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or equal to $N_{ID}^{cell}+1$, or is equal to $N_{ID}^{cell} \cdot (n_f \bmod k)_v$, where v is a positive integer; H is a function of the timeslot number, for example, is equal to the timeslot number $n_s$, or is equal to 0 (meaning that there is no parameter H in the formula); Q is a function of the cell identity, for example, is equal to the cell identity, or is equal to 0 (meaning that there is no parameter Q in the formula); $a_7$ is a non-negative integer, for example, is equal to a sum of quantities of bits occupied by $[(n_f+h) \bmod k)+w]^u \cdot P$, H, and Q in $c_{init}$; $b_7$ is a non-negative integer, for example, is equal to a sum of quantities of bits occupied by H and Q in $c_{init}$; and $c_7$ is a non-negative integer, for example, is equal to a quantity of bits occupied by Q in $c_{init}$; or the first parameter includes at least one of the radio network temporary identifier $n_{RNTI}$ the radio frame number $n_f$, the timeslot number $n_s$, or the cell identity $N_{ID}^{Ncell}$, and the initialization scrambling code seed $c_{init}$ meets the following expression:

$$c_{init}=(k_0 N_{ID}^{Ncell}+k_1)(k_2 n_f+k_3 \lfloor n_s/2 \rfloor+k_4)^{u_1} \cdot 2^{a_8}+k_5 N_{ID}^{Ncell}+k_6;$$ or $$c_{init}=k_{18} n_{RNTI} \cdot 2^{b_8}+(k_7 N_{ID}^{Ncell}+k_8)(k_9 n_{RNTI}+k_{10})[(k_{11} n_f+k_{12} \lfloor n_s/2 \rfloor+k_{13}) \bmod k_{14}+k_{15}]^{u_2} \cdot 2^{c_8}+k_{16} N_{ID}^{Ncell}+k_{17};$$ or $$c_{init}=(k_{19} N_{ID}^{Ncell}+k_{20})(k_{21} n_f+k_{22})^{u_3}(k_{23} \lfloor n_8/2 \rfloor+k_{24})^{u_4} \cdot 2^{a_8}+k_{25} N_{ID}^{Ncell}+k_{26};$$ or $$c_{init}=k_{27} n_{RNTI} \cdot 2^{e_8}+(k_{28} N_{ID}^{Ncell}+k_{29})(k_{30} n_{RNTI} k_{31})[(k_{32} n_f+k_{33}) \bmod k_{34}+k_{35}]^{u_5}(k_{36} \lfloor n_s/2 \rfloor+k_{37})^{u_6} 2^{f_8} k_{38} N_{ID}^{Ncell}+k_{39};$$

where $k_0, k_1, \ldots,$ and $k_{39}$ are non-negative integers; $a_8, b_8, c_8, d_8, e_8,$ and $f_8$ are non-negative integers; and $u_1, u_2, \ldots,$ and $a_6$ are non-negative integers. For example, in a possible implementation method, $k_0$ is equal to 1, $k_1$ is equal to 0 or 1, $k_2$ is equal to 10, $k_3$ is equal to 1, $k_4$ is equal to 0 or 1, $u_1$ is equal to 1 or 2, $a_8$ is equal to 0 or 9, $k_5$ is equal to 0 or 1, and $k_6$ is equal to 0 or 1. In a possible implementation method, $k_{18}$ is equal to 0 or 1, $b_8$ is a non-negative integer, $k_7$ is equal to 1, $k_8$ equal to 0 or 1, $k_9$ equal to 0 or 1, $k_{10}$ is equal to 0 or 1, $k_{11}$ is equal to 10, $k_{12}$ is equal to 1, $k_{13}$ is equal to 0 or 1, k is a prime number or an integer power of 2, $k_{15}$ is equal to 0 or 1, $u_2$ is equal to 1 or 2, $c_8$ is equal to 0 or 9, $k_{16}$ is equal to 0 or 1, and $k_{17}$ is equal to 0 or 1. In a possible implementation method, k is equal to 1, $k_{20}$ is equal to 0 or 1, $k_{21}$ is equal to 1, $k_{22}$ is equal to 0 or 1, $u_3$ is equal to 1 or 2, $k_{23}$ is equal to $k_{24}$ is equal to 0 or 1, $u_4$ is equal to 1 or 2, $d_8$ is equal to 0or 9, $k_{25}$ is equal to 0 or 1, and $k_{26}$ is equal to 0 or 1. In a possible implementation method, $k_{27}$ is equal to 0 or 1, $e_8$ is a non-negative integer, $k_{28}$ is equal to 1, $k_{29}$ is equal to 0 or 1, $k_{30}$ is equal to 0 or 1, $k_{31}$ is equal to 0 or 1, $k_{32}$ is equal to 1, $k_{33}$ is equal to 0 or 1, $k_{34}$ is a prime number or an integer power of 2, $k_{35}$ is equal to 0 or 1, $u_5$ is equal to 1 or 2, $k_{36}$ is equal to 1, $k_{37}$ is equal to 0 or 1, $u_6$ is equal to 1 or 2, $f_8$ is equal to 0 or 9, $k_{38}$ is equal to 0 or 1, and $k_{39}$ is equal to 0 or 1.

According to a ninth aspect, a terminal or a base station is provided, including a processing module and a receiving module, where the processing module is configured to determine a first parameter, where the first parameter includes a radio frame number or a value resulting from the radio frame number modulo a first modulus, and the first modulus is a positive integer greater than or equal to 3; the receiving module is configured to receive a scrambled first message on a first channel; and the processing module is further configured to: generate a scrambling code according to the first parameter; and descramble, according to the scrambling code, the received first message scrambled by the processing module.

Based on the ninth aspect, in a possible implementation, the first message is a system message, or the first message is a part of a system message; or the first message is an encoded system message, or the first message is a part of an encoded system message. The first channel is a physical downlink shared channel or a physical broadcast channel. In another possible implementation, the first message may be data information or control information, or may be a part of data information or control information. The first message may be encoded data information or control information, or the first message is a part of encoded data information or control information. The first channel is a physical downlink shared channel, a physical downlink control channel, a physical uplink shared channel, or a physical uplink control channel.

Based on the ninth aspect, in a possible implementation, in addition to the radio frame number or the value resulting from the radio frame number modulo the first modulus, the first parameter includes at least one of a radio network temporary identifier RNTI, a timeslot number, a symbol number, a cell identity, or a carrier identifier.

Based on the ninth aspect, in a possible implementation, the first modulus is $2^n$, where n is a positive integer greater than 1; or the first modulus is a prime number greater than or equal to 3.

Based on the ninth aspect, a possible implementation in which the processing module generates the scrambling code according to the first parameter is: generating a scrambling code initialization seed according to the first parameter, and generating the scrambling code according to the scrambling code initialization seed.

Based on the ninth aspect, an embodiment of this application further provides several possible implementations in which the processing module generates the scrambling code initialization seed according to the first time parameter.

The first parameter includes the value resulting from the radio frame number $n_f$ modulo the first modulus k, the radio network temporary identifier $n_{RNTI}$ the timeslot number $n_s$, and the cell identity $N_{ID}^{Ncell}$, and the scrambling code initialization seed $c_{init}$ meets the following expression: $c_{init} = n_{RNTI} 2^{a_1} + (n_f \bmod k) \cdot 2^{b_1} + \lfloor n_s/2 \rfloor \cdot 2^{c_1} + N_{ID}^{Ncell}$, where $a_1$ is a sum of quantities of bits occupied by $(n_f \bmod k)$, $\lfloor n_s/2 \rfloor$, and $N_{ID}^{Ncell}$ in $c_{init}$; $b_1$ is a sum of quantities of bits occupied by $\lfloor n_s/2 \rfloor$ and $N_{ID}^{Ncell}$ in $c_{init}$, and $c_1$ is a quantity of bits occupied by $N_{ID}^{Ncell}$ in $c_{init}$; or the first parameter includes the radio frame number $n_f$, the timeslot number $n_s$, and the cell identity $N_{ID}^{Ncell}$, and the scrambling code initialization seed $c_{init}$ meets the following expression: $c_{init} = n_f 2^{b_2} + \lfloor n_s/2 \rfloor \cdot 2^{c_2} + N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init} = (n_f \bmod k) \cdot 2^{b_3} + \lfloor n_s/2 \rfloor \cdot 2^{c_3} + N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init} = n_{RNTI} \cdot 2^{a_4} + (n_f \bmod k) \times 2^{a_4} + N_{ID}^{Ncell}$, where $a_4$ is a sum of quantities of bits occupied by $(n_f \bmod k)$ and $N_{ID}^{Ncell}$ in $c_{init}$ and $b_4$ is a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init} = (n_f \bmod k) \cdot 2^{25} + N_{ID}^{Ncell}$, where $b_5$ is a quantity of bits occupied by $N_{ID}^{Ncell}$ in $c_{init}$; or the first parameter includes the radio frame number of and the cell identity $N_{ID}^{Ncell}$, and the scrambling code initialization seed $c_{init}$ meets the following expression: $c_{init} = n_f 2^{b_6} + N_{ID}^{Ncell}$, where $b_6$ a quantity of bits occupied by $N_{ID}^{Ncell}$ in $c_{init}$; or the first parameter includes at least one of the radio network temporary identifier $n_{RNTI}$ the value resulting from the radio frame number $n_f$ modulo the first modulus k, the timeslot number $n_s$, or the cell identity $N_{ID}^{Ncell}$, and the initialization scrambling code seed $c_{init}$ meets the following expression: $c_{init} = R2^{a_7} + [(n_f + h) \bmod k) + w]^u \cdot P \cdot 2^{b_7} + H \cdot 2^{27} + Q$, where R is a function of the radio network temporary identifier, for example, is equal to the radio network temporary identifier $n_{RNTI}$ or is equal to 0 (meaning that there is no parameter R in the formula); h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell}+1$, or is equal to $N_{ID}^{cell} \cdot (n_f \bmod k)^v$, where v is a positive integer; H is a function of the timeslot number, for example, is equal to the timeslot number $n_s$, or is equal to 0 (meaning that there is no parameter H in the formula); Q is a function of the cell identity, for example, is equal to the cell identity, or is equal to 0 (meaning that there is no parameter Q in the formula); $a_7$ is a non-negative integer, for example, is equal to a sum of quantities of bits occupied by $[(n_f+h) \bmod k) + w]^u \cdot P$, H, and Q in $c_{init}$, $b_7$ is a non-negative integer, for example, is equal to a sum of quantities of bits occupied by H and Q in $c_{init}$; and $c_7$ is a non-negative integer, for example, is equal to a quantity of bits occupied by Q in $c_{init}$; or the first parameter includes at least one of the radio network temporary identifier $n_{RNTI}$ the radio frame number $n_f$, the timeslot number $n_s$, or the cell identity $N_{ID}^{Ncell}$, and the initialization scrambling code seed $c_{init}$ meets the following expression:

$$c_{init} = k_0 N_{ID}^{Ncell} + k_1)(k_2 n_f + k_3 \lfloor n_s/2 \rfloor + k_4)^{u_1} 2^{a_8} k_5 N_{ID}^{Ncell} 5_6; \text{ or}$$

$$c_{init} = k_{18} n_{RNTI} 2^{b_8} + (k_7 N_{ID}^{Ncell} + k_8)(k_9 n_{RNTI} + k_{10}) [(k_{11} n_f + k_{12} \lfloor n_s/2 \rfloor + k_{13}) \bmod k_{17} + k_{15}]^{u_2} \cdot 2^{c_8} + k_{16} N_{ID}^{Ncell} + k_{17}; \text{ or}$$

$$c_{init} = (k_{19} N_{ID}^{Ncell} + k_{20})(k_{21} n_f + k_{22})^{u_3} (k_{23} \lfloor n_s/2 \rfloor + k_{24})^{u_4} \cdot 2^{d_8} + k_{25} N_{ID}^{Ncell} + k_{26}; \text{ or}$$

$$c_{init} = k_{27} n_{RNTI} 2^{e_8} + (k_{28} N_{ID}^{Ncell} + k_{29})(k_{30} n_{RNTI} + k_{31}) [(k_{32} n_f + k_{33}) \bmod k_{34} + k_{34}]^{u_5} (k_{36} \lfloor n_s/2 \rfloor k_{37})^{u_6} \cdot 2^{f_8} + k_{38} N_{ID}^{Ncell} + k_{39};$$

where $k_0, k_1, \ldots$, and $k_{39}$ are non-negative integers; $a_8$, $b_8$, $c_8$, $d_8$, $e_8$, and $f_8$ are non-negative integers; and $u_1$, $u_2, \ldots$, and $u_6$ are non-negative integers. For example, in a possible implementation method, $k_0$ is equal to 1, $k_1$ is equal to 0 or 1, $k_2$ is equal to 10, k is equal to 1, $k_4$ is equal to 0 or 1, $u_1$ is equal to 1 or 2, $a_8$ is equal to 0 or 9, $k_5$ is equal to 0 or 1, and $k_6$ is equal to 0 or 1. In a possible implementation method, $k_{18}$ is equal to 0 or 1, $b_8$ is a non-negative integer, $k_7$ is equal to 1, $k_8$ is equal to 0 or 1, $k_9$ is equal to 0 or 1, $k_{10}$ is equal to 0 or 1, $k_{11}$ is equal to 10, $k_{12}$ is equal to 1, $k_{13}$ is equal to 0 or 1, $k_{14}$ is a prime number or an integer power of 2, $k_{15}$ is equal to 0 or 1, $u_2$ is equal to 1 or 2, $c_8$ is equal to 0 or 9, $k_{16}$ is equal to 0 or 1, and $k_{17}$ is equal to 0 or 1. In a possible implementation method, $k_{19}$ is equal to 1, $k_{20}$ is equal to 0 or 1, $k_{21}$ is equal to 1, $k_{22}$ is equal to 0 or 1, $u_3$ is equal to 1 or 2, $k_{23}$ is equal to 1, $k_{24}$ is equal to 0 or 1, $u_4$ is equal to 1 or 2, $d_8$ is equal to 0 or 9, $k_{25}$ is equal to 0 or 1, and $k_{26}$ is equal to 0 or 1. In a possible implementation method, $k_{27}$ is equal to 0 or 1, $e_8$ is a non-negative integer, $k_{28}$ is equal to 1, $k_{29}$ is equal to 0 or 1, $k_{30}$ is equal to 0 or 1, $k_{31}$ is equal to 0 or 1, $k_{32}$ is equal to 1, $k_{33}$ is equal to 0 or 1, $k_{34}$ is a prime number or an integer power of 2, $k_{35}$ is equal to 0 or 1, $u_5$ is equal to 1 or 2, $k_{36}$ is equal to 1, $k_{37}$ is equal to 0 or 1, $u_6$ is equal to 1 or 2, f8 is equal to 0 or 9, $k_{38}$ is equal to 0 or 1, and $k_{39}$ is equal to 0 or 1.

According to a tenth aspect, a communications system is provided, including any base station according to the eighth aspect and the terminal provided in the ninth aspect, or including any terminal according to the eighth aspect and the base station provided in the ninth aspect.

According to an eleventh aspect, a message sending method is provided, including: generating, by a base station, a scrambling code according to a cell identity and/or a first time parameter; then scrambling a system message according to the scrambling code; and finally sending the scrambled system message to a terminal on a first channel.

The first time parameter is a function of at least one of a radio frame number, a timeslot number, a hyper frame number, or a symbol number. The first channel is a physical broadcast channel or a physical downlink shared channel. The system message is a MIB or a SIB.

The scrambling, by the base station, a system message according to the scrambling code specifically includes:

repeating, by the base station, the system message, and scrambling repeated system messages together. The scrambling, by the base station, repeated system messages together specifically includes: scrambling, by the base station, the repeated system messages by using a complete scrambling code generated by using an initialization seed, where a quantity of symbols or a quantity of bits included in the complete scrambling code generated by using the initialization seed is equal to a quantity of symbols or a quantity of bits included in the repeated system messages.

Based on the eleventh aspect, in a possible implementation, the scrambling may be bit-level scrambling. For example, modulo-2 addition may be performed on the scrambling code and to-be-scrambled information. The to-be-scrambled information may be a system message or a part of a system message, or may be an encoded system message or a part of an encoded system message.

Based on the eleventh aspect, in another possible implementation, the scrambling may be symbol-level scrambling. For example, the base station may first map the scrambling code from a bit form to a symbol form. A mapping method is not limited. For example, BPSK or QPSK modulation or another similar mapping method may be performed. Then, the base station performs a pointwise multiplication operation, a pointwise conjugate multiplication operation, or the like on the scrambling code in the symbol form and to-be-scrambled information. The to-be-scrambled information may be a system message obtained after code modulation or a part of a system message obtained after code modulation.

DESCRIPTION OF EMBODIMENTS

Figure 1:
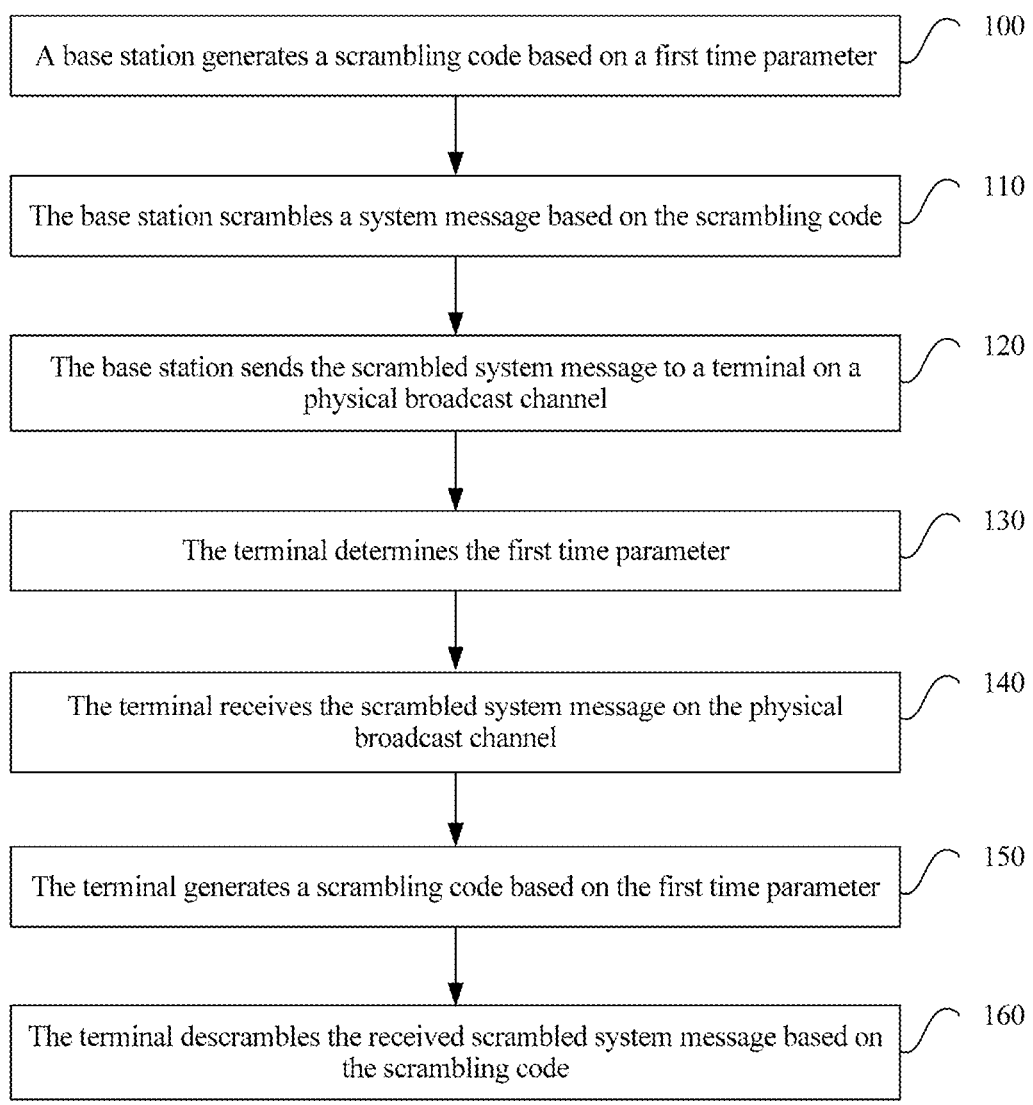
FIG. 1 is a schematic flowchart of a message transmission method according to an embodiment of this application.

The following further describes the embodiments of this application in detail with reference to the accompanying drawings.

The embodiments of this application may be applied to an LTE (Long Term Evolution) system, or may be applied to other wireless communications systems, such as a GSM (Global System for Mobile Communications), a UMTS (Universal Mobile Telecommunications System), a CDMA (Code Division Multiple Access) system, and a new network system such as a 5G (5th-Generation) network system.

A base station in the embodiments of this application may be configured to perform conversion between a received over-the-air frame and an IP (Internet Protocol) packet, and serve as a router between a wireless terminal and a remaining part of an access network. The remaining part of the access network may include an IP network. The base station in the embodiments of this application may be further configured to coordinate attribute management on an air interface. For example, the base station in the embodiments of this application may be a BTS (base transceiver station) in a GSM system or a CDMA system, may be a NodeB in WCDMA (Wideband Code Division Multiple Access), or may be an eNB (evolved NodeB) in an LTE system. This is not limited in the embodiments of this application.

A terminal in the embodiments of this application may be a device configured to provide a user with voice and/or data connectivity, a handheld device with a wireless connection function, or another processing device connected to a wireless modem. Alternatively, the terminal may be a wireless terminal. The wireless terminal may communicate with one or more core networks through a RAN (radio access network). The wireless terminal may be a mobile terminal, such as a mobile phone (or referred to as a "cellular" phone) or a computer with a mobile terminal. For example, the computer with a mobile terminal may be a portable, pocket-sized, handheld, computer built-in, or in-vehicle mobile apparatus, which exchanges voice and/or data with the radio access network. For example, alternatively, the wireless terminal may be a device such as a PCS (personal communication service) phone, a cordless phone, a SIP (Session Initiation Protocol) phone, a WLL (wireless local loop) station, or a PDA (personal digital assistant). The wireless terminal may also be referred to as a system, a subscriber unit, a subscriber station, a mobile station, a mobile, a remote station, an access point, a remote terminal, an access terminal, a user terminal, a user agent, a user device, user equipment, or the like.

In the embodiments of this application, a time variable is added in a scrambling code generation process so that, among scrambling codes generated by the base station, scrambling codes generated at some two different moments are different. Because the scrambling codes determined at the two different moments are different, anti-interference performance in system message transmission is improved.

Embodiment 1

For a system message such as a MIB transmitted on a physical broadcast channel, specifically, as shown in FIG. 1, a message sending method in this embodiment of this application includes the following steps.

Step 100: A base station generates a scrambling code according to a first time parameter.

It should be noted that the first time parameter has different values at at least two different moments in this embodiment of this application. Because the first time parameter has different values at the at least two different moments, scrambling codes generated at the at least two corresponding different moments are different. Therefore, a possibility at which the base station uses a same scrambling code to scramble a same system message repeatedly in a time period is reduced, so that an anti-interference capability in system message transmission is improved.

Step 110: The base station scrambles a system message according to the scrambling code.

It should be noted that, in this embodiment of this application, the system message may be a complete system message, or may be a part of a complete system message. The system message may be an encoded system message, or may be an uncoded system message. For example, when the complete system message is a MIB, the system message in this embodiment of this application may be the MIB, or may be a part of a MIB. When the system message in this embodiment of this application is a MIB, the MIB may be an encoded MIB, or may be a MIB before encoding. When the system message in this embodiment of this application is a part of a MIB, the part may be a part of an encoded MIB, or may be a part of an uncoded MIB.

Step 120: The base station sends the scrambled system message to a terminal on a physical broadcast channel.

For example, this embodiment of this application may also be applied to a channel other than the physical broadcast channel, for example, a channel such as a PDSCH (physical downlink shared channel), a PUSCH (physical uplink shared channel), a PDCCH (physical downlink control channel), a PUCCH (physical uplink control channel), a PCFICH (physical control format indicator channel), a PMCH (physical multicast channel), or a PRACH (physical random access channel). Names of the channels are all provided according to an LTE conventional naming rule, but the channels may have other names in another communications system. For example, the physical broadcast channel is named NPBCH (narrowband physical broadcast channel) in an NB-IoT (Narrowband Internet of Things). Further details are not described herein.

Step 130: The terminal determines the first time parameter.

For example, specifically, before sending the scrambled system message to the terminal, the base station sends a synchronization message to the terminal. The synchronization message may be used to indicate information about the first time parameter (or a part of information about the first time parameter; for example, when the first time parameter is a radio frame number in an NB-IoT system, the terminal may use the synchronization message to determine a value resulting from the radio frame number modulo 8). The first time parameter is a parameter used as a basis when the base station generates the scrambling code. The scrambling code is a scrambling code used by the base station to scramble the system message. The terminal determines the first time parameter according to the synchronization message sent by the base station. Step 130 in which the terminal determines the first time parameter may be performed before step 120, or may be performed after step 120. Alternatively, step 130 and step 120 may be simultaneously performed.

Step 140: The terminal receives the scrambled system message on the physical broadcast channel.

It should be understood that, when the base station sends the scrambled system message on another channel, the terminal receives the scrambled system message on the corresponding channel. A PDSCH is used as an example. When the base station sends the scrambled system message on the PDSCH, the terminal receives the scrambled system message on the PDSCH.

Step 150: The terminal generates a scrambling code according to the first time parameter.

For example, a manner in which the terminal generates the scrambling code according to the first time parameter is similar to a manner in which the base station generates the scrambling code according to the first time parameter. Details are not described herein again.

It should be noted that there is no definite sequence for step 140 and step 130 and for step 140 and step 150; and step 130 is performed before step 150.

Step 160: The terminal descrambles the received scrambled system message according to the scrambling code.

For example, in this embodiment of this application, the first time parameter may be a function of at least one of a radio frame number, a timeslot number, a hyper frame number, or a symbol number.

For example, the first time parameter is a function of the radio frame number. If the first time parameter is y, and the radio frame number is $n_f$, $y=f(n_f)$, where f( ) is a function relationship between y and $n_f$. A specific function relationship is determined according to a policy preset in the base station. For example, f( ) is a linear function, a slope is 2, and an intercept is 0. In this case, $y=2 \cdot n_f$. Alternatively, the first time parameter may be a function of any one or more of a radio frame number, a timeslot number, a hyper frame number, and a symbol number. Details are not described herein.

For example, the radio frame number in this embodiment of this application may be a radio frame number in which a start position for sending the system message is located, or the radio frame number may be a radio frame number in which a last location for sending the system message is located, or the like. Cases of the timeslot number, the hyper frame number, and the symbol number are similar to this, and are not described herein.

Because the radio frame number, the timeslot number, the hyper frame number, or the symbol number used to carry the system message varies with time, and the first time parameter is a function of at least one of the radio frame number, the timeslot number, the hyper frame number, or the symbol number, the first time parameter is also a physical quantity that varies with time, for example, a subframe number. Therefore, the scrambling code determined according to the first time parameter also varies with time.

For example, alternatively, the first time parameter may be another physical quantity that varies with time, for example, a subframe number, without being limited to the radio frame number, the timeslot number, the hyper frame number, and the symbol number in this embodiment of this application.

Figure 2:
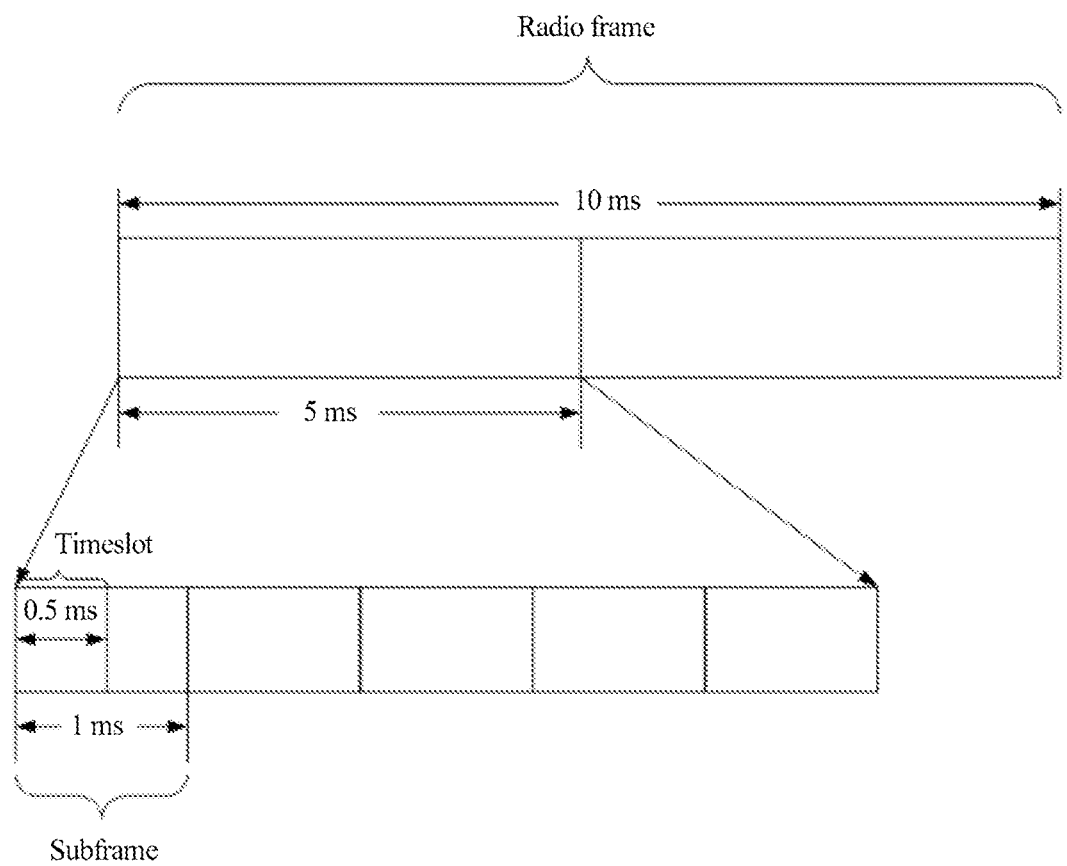
FIG. 2 is a schematic structural diagram of a radio frame in LTE.

Specifically, as shown in FIG. 2, FIG. 2 is a schematic diagram of a frame structure of a radio frame in an LTE system. The radio frame may have another name in another communications system.

A hyper frame includes one or more radio frames.

For example, in this embodiment of this application, the first time parameter is any one of a radio frame number, a timeslot number, a hyper frame number, and a symbol number; or the first time parameter is a value resulting from any one of a radio frame number, a timeslot number, a hyper frame number, and a symbol number modulo a first modulus, where the first modulus is a positive integer.

For example, a value of the first modulus may be $2^n$ where n is a positive integer. For example, the value of the first modulus may be 2, 4, 8, 16, 32, 64, 128, 256, or 512. Alternatively, the value of the first modulus may be a prime number, such as 3, 5, 7, 11, 13, 17, 19, 23, 29, 31, 37, 41, 43, 47, 53, 59, or 61. For example, the first time parameter is the radio frame number. The first time parameter is a value resulting from the radio frame number modulo the first modulus. Therefore, a benefit of doing so is that complexity of system message detection by the terminal is reduced. Because the terminal may not know all information about the radio frame number when detecting the scrambled system message, the terminal needs to perform blind detection.

For example, when the system message is a MIB, in an NB-IoT, the terminal may know, by using a synchronization message, a value resulting from the radio frame number modulo 8, and a minimum repetition period of the MIB is eight radio frames. Therefore, when the first modulus is 8, the terminal may be prevented from performing more blind detection operations on the radio frame number, and good anti-interference gains can be achieved. Therefore, in the NB-IoT, the first modulus is usually set to 8 when the system message is a MIB.

In addition, in step 100, the base station generates the scrambling code according to the first time parameter. Specifically, the scrambling code may be directly generated according to the first time parameter. It is assumed that the first time parameter is the radio frame number, and the scrambling code may be the radio frame number represented by using a binary system.

In addition, a base station may generate a scrambling code according to a first time parameter in two different implementations. One possible implementation is: The base station generates a scrambling code initialization seed according to the first time parameter, and then generates the scrambling code according to the scrambling code initialization seed. The other possible implementation is: The base station generates a scrambling code initialization seed according to the first time parameter and a first variable group, and then generates the scrambling code according to the scrambling code initialization seed. The first variable group includes at least one of a cell identity, a radio network temporary identifier RNTI, or a carrier identifier. It should be understood that, because a manner of generating the scrambling code according to the scrambling code initialization seed in this embodiment of this application is similar to that in the prior art, details are not described herein.

The base station generates the scrambling code initialization seed according to the first time parameter. Specifically, the first time parameter is the radio frame number $n_f$, and the initialization scrambling code seed $c_{init}$ meets the following expression: $c_{init}=n_f$. Alternatively, the first time parameter is a value resulting from the radio frame number $n_f$ modulo the first modulus k, and the initialization scrambling code seed $c_{init}$ meets the following expression: $c_{init}=n_f \mod k$, where k=8, k is a prime number, or k is a positive integer that is not 8 or a prime number. It should be noted that, $c_{init}=n_f$ is used as an example, and linear deformation may also be performed on $c_{init}=n_f$. An example in which $n_f$ is represented by using a binary system is used. In this case, when a condition that a sequence length of the scrambling code initialization seed is not greater than a preset threshold is met, $c_{init}=n_f$ may be deformed into $c_{init}=n_f+N$, where N is a preset constant binary sequence; or may $c_{init}=n_f$ be deformed into $c_{init}=2_n \cdot n_f+N$, where n is a quantity of bits occupied by the constant binary sequence N in $c_{init}$. Alternatively, deformation similar to that performed on $c_{init}=n_f$ may be performed when $c_{init}=n_f \mod k$. It should be understood that, a manner used when the first time parameter is the timeslot number, the hyper frame number, or the symbol number is similar to that used when the first time parameter is the radio frame number $n_f$, and details are not described herein.

$c_{init}=2^n \cdot n_f+N$ is used as an example. It is assumed that a length of $c_{init}$ is 16, of $n_f$=1011 0111, N=1100 0101, and n=8. In this case, in $c_{init}$, $n_f$ is higher eight bits, and N is lower eight bits. $c_{init}$=1011 0111 1100 0101.

The base station generates the scrambling code initialization seed according to the first time parameter and the first variable group. For example, the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, where $a_1$ is a quantity of bits occupied by $N_{ID}^{cell}$ in $c_{init}$; or the initialization scrambling code seed c" meets the following expression: $c_{init}=(N_{ID}^{cell} \cdot 2^{b_1})+n_f$, where $b_1$ is a quantity of bits occupied by $n_f$ in $c_{init}$.

In another possible example, the first time parameter is a value resulting from the radio frame number $n_f$ modulo the first modulus k, the first variable group includes the cell identity $N_{ID}^{cell}$, and the initialization scrambling code seed $c_{init}$ meets the following expression: $c_{init}=(n_f \mod k) \cdot 2^{a_2}+N_{ID}^{cell}$, where k=8, k is a prime number, or k is a positive integer that is not 8 or a prime number; and $a_2$ quantity of bits occupied by $N_{ID}^{cell}$ in $c_{init}$; or the initialization scrambling code seed $c_{init}$ meets the following expression: $c_{init}=N_{ID}^{cell} 2^{b_2}+(n_f \mod k)$, where $b_2$ is a quantity of bits occupied by $(n_f \mod k)$ in $c_{init}$.

In another possible example, the first time parameter is a value resulting from the radio frame number $n_f$ (or the radio frame number plus an integer) modulo the first modulus k, the first variable group includes the cell identity $N_{ID}^{cell}$, and the initialization scrambling code seed $c_{init}$ meets the following expression: $c_{init}=[(n_f+h)+w]^u \cdot P \cdot 2^{a_3}+Q$, or $c_{init}=[(n_f+h) \mod k)+w]^u \cdot P+Q \cdot 2^{b_3}$, where h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{cell}$, or is equal to $N_{ID}^{cell} \cdot (n_f \mod k)^v$, where v is a positive integer; Q is a function of the cell identity, for example, is equal to the cell identity, or is equal to 0 (meaning that there is no parameter Q in the formula); $a_3$ is a non-negative integer, for example, is equal to a quantity of bits occupied by Q in $c_{init}$; and $b_3$ is a non-negative integer, for example, is equal to a quantity of bits occupied by $[(n_f+h) \mod k)+w]^u \cdot P$ in $c_{init}$.

In this embodiment, the scrambling may be bit-level scrambling. For example, modulo-2 addition may be performed on the scrambling code and to-be-scrambled information. The to-be-scrambled information may be a system message or a part of a system message, or may be an encoded system message or a part of an encoded system message.

In this embodiment, the scrambling may be symbol-level scrambling. For example, the base station may first map the scrambling code from a bit form to a symbol form. A mapping method is not limited. For example, BPSK or QPSK modulation or another similar mapping method may be performed. Then, the base station performs a pointwise multiplication operation, a pointwise conjugate multiplication operation, or the like on the scrambling code in the symbol form and to-be-scrambled information. The to-be-scrambled information may be a system message obtained after code modulation or a part of a system message obtained after code modulation.

It should be noted that, in this embodiment of this application, $N_{ID}^{cell}$, $n_f$, and $n_f \mod k$ are all represented by using a binary system. $c_{init}=(n_f 2^{a_1})+N_{ID}^{cell}$ is used as an example. When $n_f$ multiplied by $2^{a_1}$, $N_{ID}^{cell}$ occupies lower bits $a_1$ bits in $c_{init}$.

It should be noted that, in this embodiment of this application, the RNTI, the timeslot number, the symbol number, the hyper frame number, the cell identity, the carrier identifier, and the like may all participate in the generation of the scrambling code initialization seed by using values resulting from them modulo the modulus. Specifically, the modulus may be a positive integer, such as a prime number or a power of 2. For example, $c_{init}=n_f 2^{a_2}+(N_{ID}^{cell} \bmod k)$.

Embodiment 2

Figure 3:
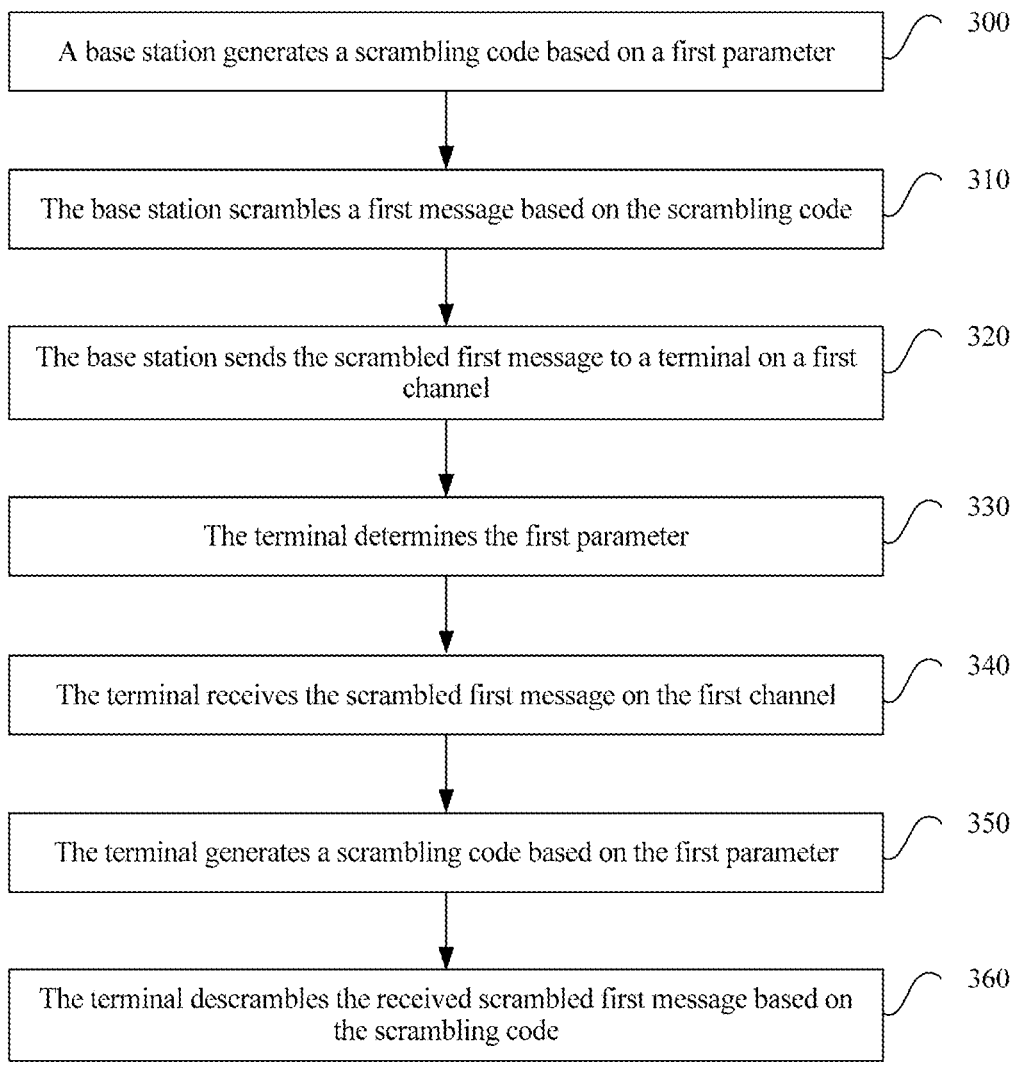
FIG. 3 is a schematic flowchart of a message transmission method according to an embodiment of this application.

For a first message such as a SIB 1 in a physical downlink shared channel, as shown in FIG. 3, a message sending method in this embodiment of this application includes the following steps.

Step 300: A base station generates a scrambling code according to a first parameter, where the first parameter includes a radio frame number or a value resulting from the radio frame number modulo a first modulus, and the first modulus is a positive integer greater than or equal to 3.

For example, the radio frame number in this embodiment of this application may be a radio frame number in which a start position for sending a first message is located, or the radio frame number may be a radio frame number in which a last location for sending a first message is located, or the like. Cases of a timeslot number, a hyper frame number, and a symbol number are similar to this, and are not described herein.

It should be noted that, in this embodiment of this application, the radio frame number varies with time, and the scrambling code generated by the base station is determined according to the first parameter. The first parameter includes the radio frame number or the value resulting from the radio frame number modulo the first modulus, and the first modulus is a positive integer greater than or equal to 3. Therefore, there are at least three different moments for the determined scrambling code, and scrambling codes generated by the base station at the at least three different moments are different. The first message is scrambled according to the scrambling code. Therefore, an anti-interference capability in transmission of the first message is improved according to this embodiment of this application.

For example, the first message is a SIB 1. In an NB-IoT, radio frame numbers that carry the SIB 1 are separated by an even quantity of radio frame numbers. Therefore, when the first modulus is a positive integer greater than or equal to 3, there are at least three different values for the value resulting from the time-varying radio frame number modulo the first modulus.

Step 310: The base station scrambles a first message according to the scrambling code.

Specifically, the first message may be a complete system message, or may be a part of a complete system message. Alternatively, the first message may be an encoded system message, or may be a part of an encoded system message. It should be noted that, alternatively, the first message may be a system message before encoding, or may be a part of a system message before encoding. For example, when the complete system message is a SIB 1, the first message in this embodiment of this application may be a SIB 1; and specifically, the first message may be an encoded SIB 1, or may be an uncoded SIB 1. Alternatively, the first message may be a part of a SIB1; and specifically, the first message may be a part of an encoded SIB 1, or may be a part of an uncoded SIB 1.

Step 320: The base station sends the scrambled first message to a terminal on a first channel.

In this embodiment of this application, the first channel may be a physical downlink shared channel.

In addition, this embodiment of this application may be applied to a channel in addition to the physical downlink shared channel, for example, a channel such as a PUSCH, a PDCCH, a PUCCH, a PCFICH, a PMCH, or a PRACH. Names of the channels are all provided according to an LTE conventional naming rule, but the channels may have other names in another communications system. For example, the physical downlink shared channel is named an NPDSCH (narrowband physical downlink shared channel) in the NB-IoT. Details are not described herein.

Step 330: The terminal determines the first parameter.

Specifically, before sending the scrambled first message to the terminal, the base station sends a synchronization message to the terminal. The synchronization message may be used to indicate information about the first parameter (or a part of information about the first parameter; for example, when the first parameter includes only a radio frame number in an NB-IoT system, the terminal may use the synchronization message to determine a value resulting from the radio frame number modulo 8). The first parameter is a parameter used as a basis when the base station generates the scrambling code. The scrambling code is a scrambling code used by the base station to scramble the first message. The terminal determines the first parameter according to the synchronization message sent by the base station. Step 330 in which the terminal determines the first parameter may be performed before step 320, or may be performed after step 320. Alternatively, step 330 and step 320 may be simultaneously performed.

Step 340: The terminal receives the scrambled first message on the first channel.

It should be understood that, in an example in which the first channel is a physical downlink shared channel, when the base station sends the scrambled system message on the physical downlink shared channel, the terminal receives the scrambled system message on the physical downlink shared channel.

Step 350: The terminal generates a scrambling code according to the first parameter.

A manner in which the terminal generates the scrambling code according to the first parameter is similar to a manner in which the base station generates the scrambling code according to the first parameter. In this embodiment of this application, the manner in which the base station generates the scrambling code according to the first parameter is described in detail. For the manner in which the terminal generates the scrambling code according to the first parameter, refer to the manner in which the base station generates the scrambling code according to the first parameter in this embodiment of this application.

It should be noted that there is no definite sequence for step 340 and step 330 and for step 340 and step 350; and step 330 is performed before step 350.

Step 360: The terminal descrambles the received scrambled first message according to the scrambling code.

In this embodiment of this application, a value of the first modulus may be $2^n$, where n is a positive integer greater than 1. For example, the value of the first modulus may be 4, 8, 16, 32, 64, 128, 256, or 512. Alternatively, the value of the first modulus may be a prime number greater than or equal to 3, such as 5, 7, 11, 13, 17, 19, 23, 29, 31, 37, 41, 43, 47, 53, 59, or 61.

Further, in addition to either of the radio frame number or the value resulting from the radio frame number modulo the first modulus, the first parameter may include at least one of an RNTI (radio network temporary identifier), a timeslot number, a symbol number, a cell identity, or a carrier identifier.

When the first message is a system message, the RNTI may be an SI-RNTI.

For example, the first parameter includes the radio frame number. Because the scrambling code is generated according to the radio frame number, the scrambling code generated according to the first parameter also varies with time, so that an anti-interference capability in sending of the first message is enhanced. In this embodiment of this application, because the first modulus is a positive integer greater than or equal to 3, at least three different values are obtained from different radio frame numbers modulo the first modulus. Therefore, at least three scrambling codes generated according to the first parameter are different, thereby ensuring that the radio frame number can make the generation of the scrambling code initialization seed more randomized.

When the first parameter includes the value resulting from the radio frame number modulo the first modulus, a quantity of bits of the obtained scrambling code is more easily not greater than a preset maximum quantity of bits. When the first modulus is a prime number greater than or equal to 3, a better anti-interference capability in sending of the first message can be achieved by using a feature of the prime number.

For example, a prime number 5 can be divided exactly only by 5 and 1. Therefore, when the first modulus is a prime number, a quantity of different values resulting from different radio frame numbers modulo the first modulus is greater than that obtained when the first modulus is a non-prime number. Therefore, when the first modulus is a prime number, a better anti-interference capability in sending of the first message can be achieved.

In step 300, the base station generates the scrambling code according to the first parameter. Specifically, the scrambling code may be directly generated according to the first parameter. It is assumed that the first parameter includes only the radio frame number, and the scrambling code may be the radio frame number represented by using a binary system. It is assumed that the first parameter includes only the value resulting from the radio frame number modulo the first modulus, and the scrambling code may be a value resulting from the radio frame number represented by using a binary system modulo the first modulus.

In addition, a base station may generate a scrambling code according to a first parameter in two different implementations. One possible implementation is: The base station generates a scrambling code initialization seed according to the first parameter, and then generates the scrambling code according to the scrambling code initialization seed. The first parameter includes only the radio frame number, or the first parameter includes only the value resulting from the radio frame number modulo the first modulus. The other possible implementation includes a same step of generating the scrambling code as the foregoing possible implementation. The base station generates a scrambling code initialization seed according to the first parameter, and then generates the scrambling code according to the scrambling code initialization seed. However, in addition to either of the radio frame number or the value resulting from the radio frame number modulo the first modulus, the first parameter includes at least one of the RNTI, the timeslot number, the symbol number, the cell identity, or the carrier identifier.

Specifically, in Example 1, the first parameter includes only the radio frame number $n_f$, and the scrambling code initialization seed $c_{init}$ meets the following expression: $c_{init}=n_f$; or the first parameter includes only the value resulting from the radio frame number of modulo the first modulus k, and the scrambling code initialization seed $c_{init}$ meets the following expression: $c_{init}=n_f \bmod k$. It should be noted that, is used as an example, and linear deformation may also be performed on $c_{init}=n_f$. An example in which $n_f$ is represented by using a binary system is used. In this case, when a condition that a sequence length of the scrambling code initialization seed is not greater than a preset threshold is met, $c_{init}=n_f$ may be deformed into $c_{init}=n_f+N$, where N is a preset constant binary sequence; or $c_{init}=n_f$ may be deformed into $c_{init}=2^n \cdot n_f+N$, where n is a quantity of bits occupied by the constant binary sequence N in $c_{init}$. Alternatively, deformation similar to that performed on $c_{init}=n_f$ may be performed when $c_{init}=n_f \bmod k$. Details are not described herein again.

$c_{init}=2^n \cdot n_f+N$ is used as an example. It is assumed that a length of $c_{init}$ is 16, $n_f$=1011 0111, N=1100 0101, and n=8. In this case, in $c_{init}$, $n_f$ is higher eight bits, and N is lower eight bits. $c_{init}$=1011 0111 1100 0101.

Example 2: The first parameter includes the value resulting from the radio frame number $n_f$ modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} \cdot 2^{a_1}+(n_f \bmod k) \cdot 2^{b_1}+\lfloor n_s/2 \rfloor \cdot 2^{c_1}+N_{ID}^{Ncell}$, where $a_1$ is a sum of quantities of bits occupied by ($n_f \bmod k$), $\lfloor n_s/2 \rfloor$, and $N_{ID}^{Ncell}$ in $c_{init}$, and $c_1$ is a quantity $b_1$ is a sum of quantities of bits occupied by $\lfloor n_s/2 \rfloor$ and $N_{ID}^{Ncell}$ in $c_{init}$ and $c_1$ is a quantity of bits occupied by $N_{ID}^{Ncell}$ in $c_{init}$.

For example, it is assumed that $c_{init}$ is a binary sequence that is not greater than 16 bits, $n_{RNTI}$=1011, ($n_f \bmod k$)=0001, $\lfloor n_s/2 \rfloor$=0101, and $N_{ID}^{Ncell}$=1010. In this case, $a_1$=12, $b_1$=8, and $c_1$=4. Because $c_{init}=n_{RNTI} \cdot 2^a+(n_f \bmod k) \cdot 2^{b_1}+\lfloor n_s/2 \rfloor \cdot 2^{c_1}+N_{ID}^{Ncell}$, $c_{init}$=1011 0001 0101 1010. That is, $n_{RNTI}$ occupies highest four bits in $c_{init}$, ($n_f \bmod k$) occupies higher four bits in $c_{init}$, $\lfloor n_s/2 \rfloor$ occupies lower four bits in $c_{init}$, and $N_{ID}^{Ncell}$ occupies lowest four bits.

It should be noted that, in this embodiment, specific bits respectively occupied by $n_{RNTI}$, ($n_f \bmod k$), $\lfloor n_s/2 \rfloor$, and $N_{ID}^{Ncell}$ in $c_{init}$ may be interchanged. This is not limited in this application. For example $c_{init}=n_{RNTI}+(n_f \bmod k) \cdot 2^{c_1}+\lfloor n_s/2 \rfloor \cdot 2^{b_1}+N_{ID}^{Ncell} \cdot 2^{a_1}$. In this case, if $c_{init}$ is a binary sequence that is not greater than 16 bits, $a_1$=12, $b_1$=8, and $c_1$=4, $n_{RNTI}$ occupies lowest four bits in $c_{init}$, ($n_f \bmod k$) occupies lower four bits in $c_{init}$, $\lfloor n_s/2 \rfloor$ occupies higher four bits in $c_{init}$, and $N_{ID}^{Ncell}$ occupies highest four bits.

Example 3: The first parameter includes the radio frame number $n_f$, the timeslot number $n_s$, and the cell identity $N_{ID}^{Ncell}$, and the scrambling code initialization seed $c_{init}$ meets the following expression: $c_{init}=n_f 2^{b_2}+\lfloor n_s/2 \rfloor \cdot 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$.

Example 4: The first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \bmod k) \cdot 2^{b_3}+\lfloor n_s/2 \rfloor 2^{c_3}+N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$.

Example 5: The first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI}\cdot 2^{a_4}+(n_f \bmod k)\cdot 2^{b_4}+N_{ID}^{Ncell}$, where $a_4$ is a sum of quantities of bits occupied by $(n_f \bmod k)$ and $N_{ID}^{Ncell}$ in $c_{init}$, and $b_4$ is a quantity of bits occupied by $N_{ID}^{Ncell}$ in $c_{init}$.

Example 6: The first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \bmod k)\cdot 2^{b_5}+N_{ID}^{Ncell}$, where $b_5$ is a quantity of bits occupied by $N_{ID}^{Ncell}$ in $c_{init}$.

Example 7: The first parameter includes the radio frame number $n_f$ and the cell identity $N_{ID}^{Ncell}$, and the scrambling code initialization seed $c_{init}$ meets the following expression: $c_{init}=n_f \cdot 2^{b_6}+N_{ID}^{Ncell}$, where $b_6$ is a quantity of bits occupied by $N_{ID}^{Ncell}$ in $c_{init}$.

Example 8: The first parameter includes at least one of the radio network temporary identifier $n_{RNTI}$, the value resulting from the radio frame number $n_f$ modulo the first modulus k, the timeslot number $n_s$, or the cell identity $N_{ID}^{Ncell}$, and the initialization scrambling code seed $c_{init}$ meets the following expression: $c_{init}=R\cdot 2^{a_7}+[(n_f+h)\bmod k)+w]^u \cdot P \cdot 2^{b_7}+H\cdot 2^{c_7}+Q$, where R is a function of the radio network temporary identifier, for example, is equal to the radio network temporary identifier $n_{RNTI}$ or is equal to 0 (meaning that there is no parameter R in the formula); h is an integer, for example, is equal to 0 or 1; k=8, k is a prime number, or k is a positive integer that is not 8 or a prime number; w is an integer, for example, is equal to 0 or 1; u is a non-negative integer, for example, 0, 1, 2, or 3; P is a function of the cell identity and/or the radio frame number, for example, is equal to the cell identity $N_{ID}^{Ncell}$, or is equal to $N_{ID}^{Ncell}\cdot(n_f \bmod k)^v$, where v is a positive integer; H is a function of the timeslot number, for example, is equal to the timeslot number $n_s$, or is equal to 0 (meaning that there is no parameter H in the formula); Q is a function of the cell identity, for example, is equal to the cell identity, or is equal to 0 (meaning that there is no parameter Q in the formula); $a_7$ is a non-negative integer, for example, is equal to a sum of quantities of bits occupied by $[(n_f+h)\bmod k)+w]^u \cdot P$, H, and Q in $c_{init}$; $b_7$ is a non-negative integer, for example, is equal to a sum of quantities of bits occupied by H and Q in $c_{init}$; and $c_7$ is a non-negative integer, for example, is equal to a quantity of bits occupied by Q in $c_{init}$.

It should be noted that Example 3 to Example 8 are similar to Example 2. In this embodiment of this application, higher bits and lower bits in the bits occupied in $c_{init}$ by variables included in the first parameter may be interchanged. Example 1 to Example 8 are merely examples for describing the technical solution of this embodiment of this application, and are not intended to limit the technical solution of this embodiment of this application.

It should be noted that the first parameter may further include at least one of the symbol number, the hyper frame number, or the carrier identifier. In this embodiment of this application, the RNTI, the timeslot number, the symbol number, the hyper frame number, the cell identity, the carrier identifier, and the like may all participate in the generation of the scrambling code initialization seed by using values resulting from them modulo the modulus. Specifically, the modulus may be a prime number or a power of 2. For example, the first parameter includes the radio frame number $n_f$ and the cell identity $N_{ID}^{Ncell}$, and the scrambling code initialization seed $c_{init}$ meets the following expression: $c_{init}=n_f \cdot 2^{b_6}+N_{ID}^{Ncell} \bmod k$, where $b_6$ is a quantity of bits occupied by $N_{ID}^{Ncell}$ in $c_{init}$.

In a possible implementation of this embodiment of this application, the base station sends, to the terminal, indication information used to indicate a manner of scrambling the first channel/first information.

Specifically, that the base station sends, to the terminal, indication information used to indicate a manner of scrambling the first channel/first information includes: The indication information may be used to indicate a manner of determining a scrambling code initialization seed of the first channel/first information and/or a scrambling code initialization method.

Specifically, the scrambling code initialization method includes at least one of a scrambling code length or a scrambling code initialization frequency/period.

The indication information may be located in a system message (a MIB or a SIB), and be sent by the base station to the terminal by using a PBCH or a PDSCH.

For example, the first message is a system message such as a SIB 1, and the first channel is a PDSCH. The indication information may be located in a system message MIB and be transmitted in a PBCH.

For example, the indication information may include two binary values 0 and 1, and different values of the indication information may be corresponding to different manners of scrambling the first channel/first information. For example, 0 indicates a method 1 for determining a scrambling code initialization seed, and 1 indicates a method 2 for determining a scrambling code initialization seed.

For example, the indication information may include four binary values 00, 01, 10, and 11 that may be respectively corresponding to M manners of scrambling the first channel/first information, for example, respectively corresponding to M methods for determining a scrambling code initialization seed of the first channel/first information. A value range of M is 11, 2, 3, 41. When M<4, at least one of four states 00, 01, 10, or 11 may be selectively used.

In the foregoing example, the indication information may include another quantity of values, and details are not described herein.

Figure 4A:
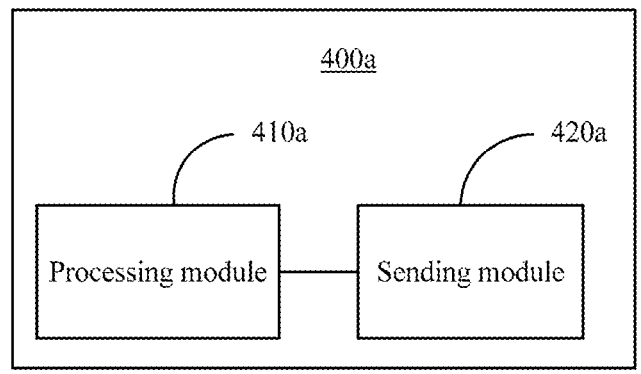
FIG. 4a is a schematic structural diagram of a base station according to an embodiment of this application.
Figure 5A:
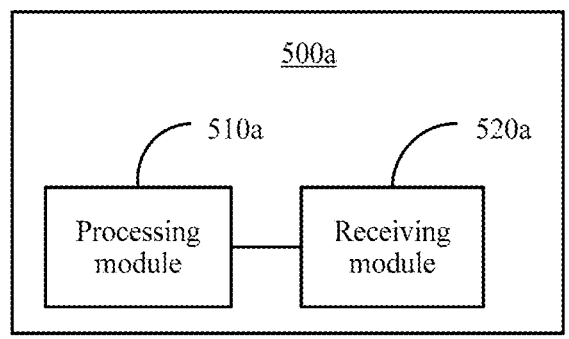
FIG. 5a is a schematic structural diagram of a terminal according to an embodiment of this application.
Figure 6:
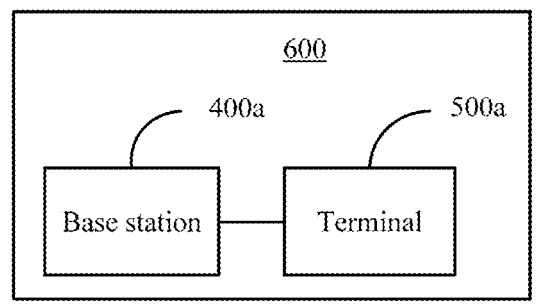
FIG. 6 is a schematic diagram of a communications system according to an embodiment of this application.

According to a same inventive concept, the embodiments of the present invention further provide a base station shown in FIG. 4a, a terminal shown in FIG. 5a, and a communications system shown in FIG. 6. A method corresponding to the base station shown in FIG. 4a, the terminal shown in FIG. 5a, and the communications system shown in FIG. 6 is the message transmission method shown in FIG. 1 in the embodiment of this application. Therefore, in the embodiments of this application, for implementations of the base station shown in FIG. 4a, the terminal shown in FIG. 5a, and the communications system shown in FIG. 6, refer to the implementation of the method shown in FIG. 1. No repeated description is provided.

As shown in FIG. 4a, a base station 400a in an embodiment of this application includes a processing module 410a and a sending module 420a. The processing module 410a is configured to: generate a scrambling code according to a first time parameter, and scramble a system message according to the scrambling code. The sending module 420a is configured to send, to a terminal on a physical broadcast channel, the system message scrambled by the processing module 410a.

In a possible implementation, the first time parameter is a function of at least one of a radio frame number, a timeslot number, a hyper frame number, or a symbol number.

In a possible implementation, the first time parameter is any one of a radio frame number, a timeslot number, a hyper frame number, and a symbol number.

Alternatively, the first time parameter is a value resulting from any one of a radio frame number, a timeslot number, a hyper frame number, and a symbol number modulo a first modulus, where the first modulus is a positive integer.

In a possible implementation, the first modulus is $2^n$, where n is a positive integer that is not equal to 3; or the first modulus is 8; or the first modulus is a prime number.

A possible implementation in which the processing module 410a generates the scrambling code according to the first time parameter is: generating a scrambling code initialization seed according to the first time parameter and a first variable group, and generating the scrambling code according to the scrambling code initialization seed, where the first variable group includes at least one of a cell identity, a radio network temporary identifier RNTI, or a carrier identifier.

Another possible implementation in which the processing module 410a generates the scrambling code according to the first time parameter is: generating a scrambling code initialization seed according to the first time parameter, and generating the scrambling code according to the scrambling code initialization seed.

This embodiment of this application further provides several possible implementations in which the base station generates the scrambling code initialization seed according to the first time parameter.

The first time parameter is the radio frame number $n_f$, and the initialization scrambling code seed $c_{init}$ meets the following expression: $c_{init}=n_f$; or the first time parameter is a value resulting from the radio frame number $n_f$ modulo the first modulus k, and the initialization scrambling code seed $c_{init}$ meets the following expression: $c_{init}=n_f \bmod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=(N_{ID}^{cell} \cdot 2^{b_1})+n_f$, where $a_1$ is a quantity of bits occupied by $N_{ID}^{cell}$ in $c_{init}$ and $b_1$ is a quantity of bits occupied by $n_f$ in $c_{init}$; or the first time parameter is a value resulting from the radio frame number $n_f$ modulo the first modulus k, the first variable group includes the cell identity $N_{ID}^{Ncell}$, and the initialization scrambling code seed $c_{init}$ meets the following expression: $c_{init}=(n_f \bmod k) \cdot 2^{a_2}+N_{ID}^{Cell}$, or $c_{init}=(n_f \bmod k) \cdot 2^{a_2}+N_{ID}^{Cell}$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \bmod k)$ in $c_{init}$.

Figure 4B:
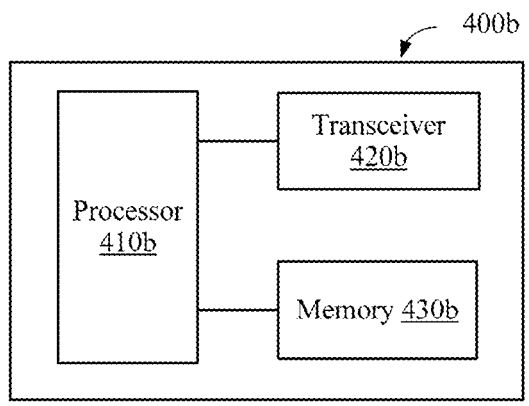
FIG. 4b is a schematic structural diagram of hardware of a base station according to an embodiment of this application.

It should be noted that, in this embodiment of this application, the processing module 410a may be implemented by a processor, and the sending module 420a may be implemented by a transceiver. As shown in FIG. 4b, a base station 400b may include a processor 410b, a transceiver 420b, and a memory 430b. The memory 430b may be configured to store a program/code pre-installed when the base station 400b is delivered from a factory, or may store code executed by the processor 410b, or the like.

The processor 410b may be a general-purpose CPU (central processing unit), a microprocessor, an ASIC (application-specific integrated circuit), or one or more integrated circuits, and is configured to perform a related operation, so as to implement the technical solution provided in this embodiment of this application.

It should be noted that although only the processor 410b, the transceiver 420b, and the memory 430b are shown in the base station 400b shown in FIG. 4b, in a specific implementation process, persons skilled in the art should understand that the base station 400b further includes another device required for implementing normal running. In addition, persons skilled in the art should understand that, according to a specific requirement, the base station 400b may further include a hardware device that implements another additional function. In addition, persons skilled in the art should understand that the base station 400b may include only devices or modules required for implementing this embodiment of this application, but not necessarily include all the devices shown in FIG. 4b.

Persons of ordinary skill in the art may understand that all or some of the processes of the methods in the embodiments may be implemented by a computer program instructing relevant hardware. The program may be stored in a computer readable storage medium. When the program is executed, the processes of the methods in the embodiments may be included. The foregoing storage medium may be a magnetic disk, an optical disc, a ROM (read-only memory), a RAM (random access memory), or the like.

As shown in FIG. 5a, a terminal 500a in an embodiment of this application includes a processing module 510a and a receiving module 520a. The processing module 510a is configured to determine a first time parameter. The receiving module 520a is configured to receive a scrambled system message on a physical broadcast channel. The processing module 510a is further configured to: generate a scrambling code according to the first time parameter; and descramble, according to the scrambling code, the scrambled system message received by the receiving module 520a.

In a possible implementation, the first time parameter is a function of at least one of a radio frame number, a timeslot number, a hyper frame number, or a symbol number.

In a possible implementation, the first time parameter is any one of a radio frame number, a timeslot number, a hyper frame number, and a symbol number.

Alternatively, the first time parameter is a value resulting from any one of a radio frame number, a timeslot number, a hyper frame number, and a symbol number modulo a first modulus, where the first modulus is a positive integer.

In a possible implementation, the first modulus is $2^n$, where n is a positive integer that is not equal to 3; or the first modulus is 8; or the first modulus is a prime number.

A possible implementation in which the processing module 510a generates the scrambling code according to the first time parameter is: generating a scrambling code initialization seed according to the first time parameter and a first variable group, and generating the scrambling code according to the scrambling code initialization seed, where the first variable group includes at least one of a cell identity, a radio network temporary identifier RNTI, or a carrier identifier.

Another possible implementation in which the processing module 510a generates the scrambling code according to the first time parameter is: generating a scrambling code initialization seed according to the first time parameter, and generating the scrambling code according to the scrambling code initialization seed.

This embodiment of this application further provides several possible implementations in which the terminal generates the scrambling code initialization seed according to the first time parameter.

The first time parameter is the radio frame number $n_f$, and the initialization scrambling code seed $c_{init}$ meets the following expression: $c_{init}=n_f$; or the first time parameter is a value resulting from the radio frame number $n_f$ modulo the first modulus k, and the initialization scrambling code seed $c_{init}$ meets the following expression: $c_{init}=n_f \bmod k$, where k=8, k is a prime number, or k is a positive integer that is not 8 or a prime number; or the first time parameter is the radio frame number $n_f$, the first variable group includes the cell identity $N_{ID}^{cell}$, and the initialization scrambling code seed $c_{init}$ meets the following expression: $c_{init}=(n_f \cdot 2^{a_1})+N_{ID}^{cell}$, or $c_{init}=(N_{ID}^{cell} \cdot 2^{b_1})+n_f$, where $a_1$ is a quantity of bits occupied by $N_{ID}^{cell}$ in $c_{init}$, and $b_1$ is a quantity of bits occupied by $n_f$ in $c_{init}$; or the first time parameter is a value resulting from the radio frame number of modulo the first modulus k, the first variable group includes the cell identity $N_{ID}^{cell}$, and the initialization scrambling code seed $c_{init}$ meets the following expression: $c_{init}=(n_f \bmod k) \cdot 2^{a_2}+N_{ID}^{Cell}$, or $c_{init}=N_{ID}^{Cell} \cdot 2^{b_2}+(n_f \bmod k)$, where k=8, k is a prime number, or k is a positive integer that is not 8 or a prime number; $a_2$ is a quantity of bits occupied by $N_{ID}^{cell}$ in $c_{init}$; and $b_2$ is a quantity of bits occupied by $(n_f \bmod k)$ in $c_{init}$.

Figure 5B:
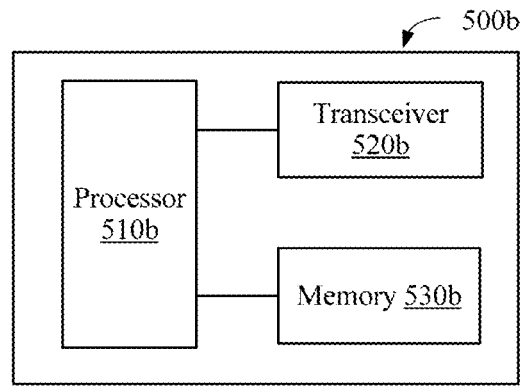
FIG. 5b is a schematic structural diagram of hardware of a terminal according to an embodiment of this application.

It should be noted that, in this embodiment of this application, the processing module 510a may be implemented by a processor, and the receiving module 520a may be implemented by a transceiver. As shown in FIG. 5b, a terminal 500b may include a processor 510b, a transceiver 520b, and a memory 530b. The memory 530b may be configured to store a program/code pre-installed when the terminal 500b is delivered from a factory, or may store code executed by the processor 510b, or the like.

The processor 510b may be a general-purpose CPU, a microprocessor, an ASIC, or one or more integrated circuits, and is configured to perform a related operation, so as to implement the technical solution provided in this embodiment of this application.

It should be noted that although only the processor 510b, the transceiver 520b, and the memory 530b are shown in the terminal 500b shown in FIG. 5b, in a specific implementation process, persons skilled in the art should understand that the terminal 500b further includes another device required for implementing normal running. In addition, persons skilled in the art should understand that, according to a specific requirement, the terminal 500b may further include a hardware device that implements another additional function. In addition, persons skilled in the art should understand that the terminal 500b may include only devices or modules required for implementing this embodiment of this application, but not necessarily include all the devices shown in FIG. 5b.

Persons of ordinary skill in the art may understand that all or some of the processes of the methods in the embodiments may be implemented by a computer program instructing relevant hardware. The program may be stored in a computer readable storage medium. When the program is executed, the processes of the methods in the embodiments may be included. The foregoing storage medium may be a magnetic disk, an optical disk, a ROM, a RAM, or the like.

As shown in FIG. 6, a communications system 600 in an embodiment of this application includes the base station 400a shown in FIG. 4a and the terminal 500a shown in FIG. 5a.

Figure 7A:
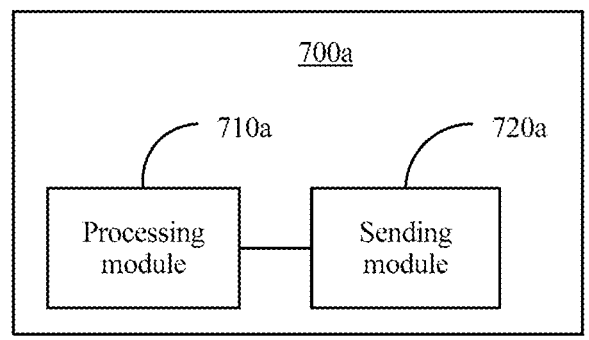
FIG. 7a is a schematic structural diagram of a base station according to an embodiment of this application.
Figure 8A:
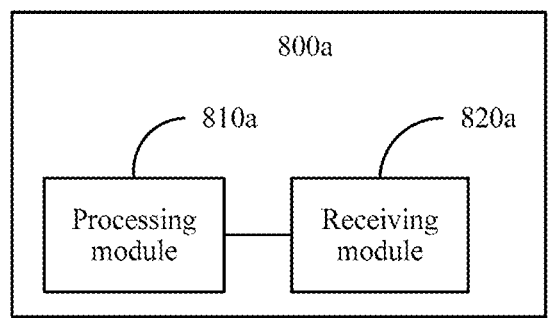
FIG. 8a is a schematic structural diagram of a terminal according to an embodiment of this application.
Figure 9:
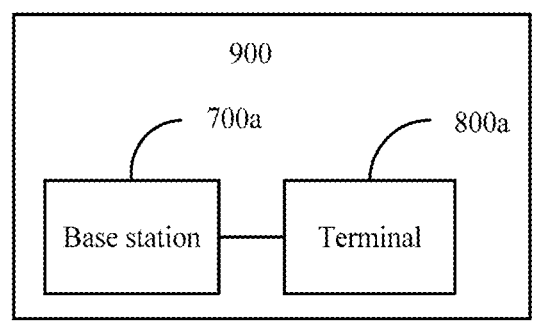
FIG. 9 is a schematic diagram of a communications system according to an embodiment of this application.

According to a same inventive concept, the embodiments of the present invention further provide a base station shown in FIG. 7a, a terminal shown in FIG. 8a, and a communications system shown in FIG. 9. A method corresponding to the base station shown in FIG. 7a, the terminal shown in FIG. 8a, and the communications system shown in FIG. 9 is the message transmission method shown in FIG. 3 in the embodiment of this application.

Therefore, in the embodiments of this application, for implementations of the base station shown in FIG. 7a, the terminal shown in FIG. 8a, and the communications system shown in FIG. 9, refer to the implementation of the method shown in FIG. 3. No repeated description is provided.

As shown in FIG. 7a, a base station 700a in an embodiment of this application includes a processing module 710a and a sending module 720a. The processing module 710a is configured to: generate a scrambling code according to a first parameter, and scramble a first message according to the scrambling code. The first parameter includes a radio frame number or a value resulting from the radio frame number modulo a first modulus, and the first modulus is a positive integer greater than or equal to 3. The sending module 720a is configured to send the scrambled first message to a terminal on a first channel.

In a possible implementation, the first message is a system message, or the first message is a part of a system message; or the first message is an encoded system message, or the first message is a part of an encoded system message. The first channel is a physical downlink shared channel or a physical broadcast channel.

In a possible implementation, in addition to the radio frame number or the value resulting from the radio frame number modulo the first modulus, the first parameter includes at least one of a radio network temporary identifier RNTI, a timeslot number, a symbol number, a cell identity, or a carrier identifier.

In a possible implementation, the first modulus is $2^n$, where n is a positive integer greater than 1; or the first modulus is a prime number greater than or equal to 3.

A possible implementation in which the processing module 710a generates the scrambling code according to the first parameter is: generating a scrambling code initialization seed according to the first parameter, and generating the scrambling code according to the scrambling code initialization seed.

This embodiment of this application further provides several possible implementations in which the base station generates the scrambling code initialization seed according to the first parameter.

The first parameter includes the value resulting from the radio frame number $n_f$ modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} \cdot 2^{a_1}+(n_f \bmod k) \cdot 2^{b_1}+\lfloor n_s/2 \rfloor \cdot 2^{c_1}+N_{ID}^{Ncell}$, where $a_1$ is a sum of quantities of bits occupied by $(n_f \bmod k)$, $\lfloor n_s/2 \rfloor$, and $N_{ID}^{Ncell}$ in $c_{init}$, $b_1$ is a sum of quantities of bits occupied by $\lfloor n_s/2 \rfloor$ and $N_{ID}^{Ncell}$ in $c_{init}$, and $c_1$ is a quantity of bits occupied by $N_{ID}^{Ncell}$ in $c_{init}$; or the first parameter includes the radio frame number $n_f$, the timeslot number $n_s$, and the cell identity $N_{ID}^{Ncell}$, and the scrambling code initialization seed $c_{init}$ meets the following expression: $c_{init}=n_f \cdot 2^{a_2}+\lfloor n_s/2 \rfloor \cdot 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $c_2$ is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \bmod k) \cdot 2^{b_3}+\lfloor n_s/2 \rfloor \cdot 2^{c_3}+N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$, the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI} \cdot 2^{a_4}+(n_f \bmod k) \cdot 2^{b_4}+N_{ID}^{Ncell}$, where $a_4$ is a sum of quantities of bits occupied by ($n_f \bmod k$) and $N_{ID}^{Ncell}$ in $c_{init}$ and $b_4$ is a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \bmod k) \cdot 2^{b_5}+N_{ID}^{Ncell}$, where $b_5$ is a quantity of bits occupied by $N_{ID}^{Ncell}$ in $c_{init}$; or the first parameter includes the radio frame number $n_f$ and the cell identity $N_{ID}^{Ncell}$ and the scrambling code initialization seed $c_{init}$ meets the following expression: $c_{init}=n_f \cdot 2^{b_6}+N_{ID}^{Ncell}$, where $b_6$ is a quantity of bits occupied by $N_{ID}^{Ncell}$ in $c_{init}$.

Figure 7B:
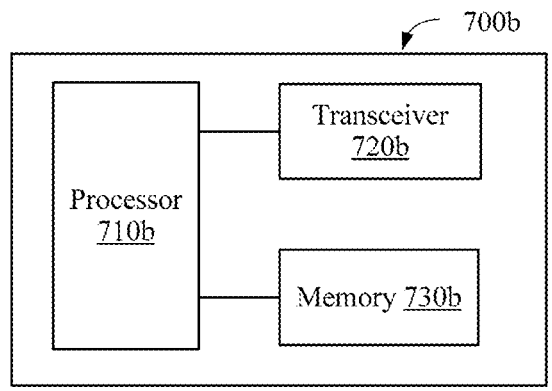
FIG. 7b is a schematic structural diagram of hardware of a base station according to an embodiment of this application.

It should be noted that, in this embodiment of this application, the processing module 710a may be implemented by a processor, and the sending module 720a may be implemented by a transceiver. As shown in FIG. 7b, a base station 700b may include a processor 710b, a transceiver 720b, and a memory 730b. The memory 730b may be configured to store a program/code pre-installed when the base station 700b is delivered from a factory, or may store code executed by the processor 710b, or the like.

The processor 710b may be a general-purpose CPU, a microprocessor, an ASIC, or one or more integrated circuits, and is configured to perform a related operation, so as to implement the technical solution provided in this embodiment of this application.

It should be noted that although only the processor 710b, the transceiver 720b, and the memory 730b are shown in the base station 700b shown in FIG. 7b, in a specific implementation process, persons skilled in the art should understand that the base station 700b further includes another device required for implementing normal running. In addition, persons skilled in the art should understand that, according to a specific requirement, the base station 700b may further include a hardware device that implements another additional function. In addition, persons skilled in the art should understand that the base station 700b may include only devices or modules required for implementing this embodiment of this application, but not necessarily include all the devices shown in FIG. 7b.

Persons of ordinary skill in the art may understand that all or some of the processes of the methods in the embodiments may be implemented by a computer program instructing relevant hardware. The program may be stored in a computer readable storage medium. When the program is executed, the processes of the methods in the embodiments may be included. The foregoing storage medium may be a magnetic disk, an optical disk, a ROM, a RAM, or the like.

As shown in FIG. 8a, a terminal 800a in an embodiment of this application includes a processing module 810a and a receiving module 820a. The processing module 810a is configured to determine a first parameter. The first parameter includes a radio frame number or a value resulting from the radio frame number modulo a first modulus, and the first modulus is a positive integer greater than or equal to 3. The receiving module 820a is configured to receive a scrambled first message on a first channel. The processing module 810a is further configured to: generate a scrambling code according to the first parameter; and descramble, according to the scrambling code, the scrambled first message received by the receiving module 820a.

In a possible implementation, the first message is a system message, or the first message is a part of a system message; or the first message is an encoded system message, or the first message is a part of an encoded system message. The first channel is a physical downlink shared channel or a physical broadcast channel.

In a possible implementation, in addition to the radio frame number or the value resulting from the radio frame number modulo the first modulus, the first parameter includes at least one of a radio network temporary identifier RNTI, a timeslot number, a symbol number, a cell identity, or a carrier identifier.

In a possible implementation, the first modulus is $2^n$, where n is a positive integer greater than 1; or the first modulus is a prime number greater than or equal to 3.

A possible implementation in which the processing module 810a generates the scrambling code according to the first parameter is: generating a scrambling code initialization seed according to the first parameter, and generating the scrambling code according to the scrambling code initialization seed.

This embodiment of this application further provides several possible implementations in which the processing module 810a generates the scrambling code initialization seed according to the first time parameter.

The first parameter includes the value resulting from the radio frame number of modulo the first modulus k, the radio network temporary identifier $n_{RNTI}$, the timeslot number $n_s$, and the cell identity $N_{ID}^{Ncell}$, and the scrambling code initialization seed $c_{init}$ meets the following expression: $c_{init}=n_{RNTI} \cdot 2^{a_1}+(n_f \bmod k) \cdot 2^{b_1}+\lfloor n_s/2 \rfloor \cdot 2^{c_1}+N_{ID}^{Ncell}$, where $a_1$ is a sum of quantities of bits occupied by ($n_f \bmod k$), $\lfloor n_s/2 \rfloor$, and $N_{ID}^{Ncell}$ in $c_{init}$, $b_1$ is a sum of quantities of bits occupied by $\lfloor n_s/2 \rfloor$ and $N_{ID}^{Ncell}$ in $c_{init}$, and $c_1$ is a quantity of bits occupied by $N_{ID}^{Ncell}$ in $c_{init}$; or the first parameter includes the radio frame number $n_f$, the timeslot number $n_s$, and the cell identity $N_{ID}^{Ncell}$, and the scrambling code initialization seed $c_{init}$ meets the following expression: $c_{init}=n_f 2^{b_2}+\lfloor n_s/2 \rfloor \cdot 2^{c_2}+N_{ID}^{Ncell}$, where $b_2$ is a sum of quantities of bits occupied by $\lfloor n_s/2 \rfloor$ and $N_{ID}^{Ncell}$ in $c_{init}$, and $C_2$ and is a quantity of bits occupied by $N_{ID}^{Ncell}$ in $c_{init}$; or the first parameter includes the value resulting from the radio frame number $n_f$ modulo the first modulus k, the timeslot number $n_s$, and the cell identity $N_{ID}^{Ncell}$, and the scrambling code initialization seed $c_{init}$ meets the following expression: $c_{init}=(n_f \bmod k) \cdot 2^{b_3}+\lfloor n_s/2 \rfloor \cdot 2^{c_3}+N_{ID}^{Ncell}$, where $b_3$ is a sum of quantities of bits occupied by $\lfloor n_s/2 \rfloor$ and $N_{ID}^{Ncell}$ in $c_{init}$, and $c_3$ is a quantity of bits occupied by $N_{ID}^{Ncell}$ in $c_{init}$; or the first parameter includes the radio network temporary identifier $n_{RNTI}$ the value resulting from the radio frame number $n_f$ modulo the first modulus k, and the cell identity $N_{ID}^{Ncell}$, and the scrambling code initialization seed $c_{init}$ meets the following expression: $c_{init}=n_{RNTI} 2^{a_4}+(n_f \bmod k) \cdot 2^{b_4}+N_{ID}^{Ncell}$, where $a_4$ is a sum of quantities of bits occupied by ($n_f \bmod k$) and $N_{ID}^{Ncell}$ in $c_{init}$, and $b_4$ is a quantity of bits occupied by $N_{ID}^{Ncell}$ in $c_{init}$; or the first parameter includes the cell identity $N_{ID}^{Ncell}$ and the value resulting from the radio frame number $n_f$ modulo the first modulus k, and the scrambling code initialization seed $c_{init}$ meets the following expression: $c_{init}=(n_f \bmod k) \cdot 2^{b_5}+N_{ID}^{Ncell}$, where $b_5$ is a quantity of bits occupied by $N_{ID}^{Ncell}$ in $c_{init}$; or the first parameter includes the radio frame number $n_f$ and the cell identity $N_{ID}^{Ncell}$, and the scrambling code initialization seed $c_{init}$ meets the following expression: $c_{init}=n_f \cdot 2^{b_6}+N_{ID}^{Ncell}$, where $b_6$ is a quantity of bits occupied by $N_{ID}^{Ncell}$ in $c_{init}$.

Figure 8B:
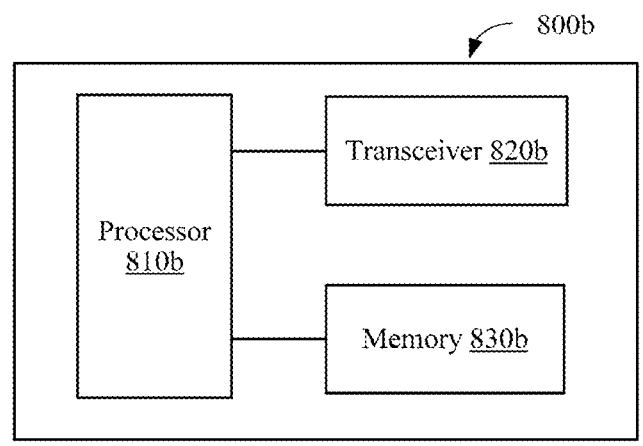
FIG. 8b is a schematic structural diagram of hardware of a terminal according to an embodiment of this application.

It should be noted that, in this embodiment of this application, the processing module 810a may be implemented by a processor, and the receiving module 820a may be implemented by a transceiver. As shown in FIG. 8b, a terminal 800b may include a processor 810b, a transceiver 820b, and a memory 830b. The memory 830b may be configured to store a program/code pre-installed when the terminal 800b is delivered from a factory, or may store code executed by the processor 810b, or the like.

The processor 810b may be a general-purpose CPU, a microprocessor, an ASIC, or one or more integrated circuits, and is configured to perform a related operation, so as to implement the technical solution provided in this embodiment of this application.

It should be noted that although only the processor 810b, the transceiver 820b, and the memory 830b are shown in the terminal 800b shown in FIG. 8b, in a specific implementation process, persons skilled in the art should understand that the terminal 800b further includes another device required for implementing normal running. In addition, persons skilled in the art should understand that, according to a specific requirement, the terminal 800b may further include a hardware device that implements another additional function. In addition, persons skilled in the art should understand that the terminal 800b may include only devices or modules required for implementing this embodiment of this application, but not necessarily include all the devices shown in FIG. 8b.

Persons of ordinary skill in the art may understand that all or some of the processes of the methods in the embodiments may be implemented by a computer program instructing relevant hardware. The program may be stored in a computer readable storage medium. When the program is executed, the processes of the methods in the embodiments may be included. The foregoing storage medium may be a magnetic disk, an optical disk, a ROM, a RAM, or the like.

As shown in FIG. 9, a communications system 900 in an embodiment of this application includes the base station 700a shown in FIG. 7a and the terminal 800a shown in FIG. 8a.

In conclusion, in the embodiments of this application, a base station generates a scrambling code according to a first time parameter, then scrambles a system message according to the scrambling code, and finally sends the scrambled system message to a terminal on a physical broadcast channel. In this technical solution, because the first time parameter has different values at at least two different moments, scrambling codes determined at the at least two corresponding different moments are different. Therefore, a possibility at which the base station uses a same scrambling code to scramble a same system message repeatedly in a time period is reduced, so that an anti-interference capability in system message transmission is improved.

Persons skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer usable storage media (including but not limited to a magnetic disk memory, a CD-ROM, an optical memory, and the like) that include computer usable program code.

The embodiments of this application have been described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Persons skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A message sending method, comprising:
generating a scrambling code according to a scrambling code initialization seed $c_{init}$, wherein the scrambling code initialization seed meets the following expression:

$$c_{init}=(N_{ID}^{Ncell}+1)((10n_f+\lfloor n_2/2 \rfloor) \bmod k_{14}+1) \cdot 2^9 + N_{ID}^{Ncell}, \text{ wherein } k_{14} \text{ is an integer power of 2,}$$

wherein $N_{ID}^{Ncell}$ is a cell identity, $n_f$ is a radio frame number, and $n_s$ is a slot number; and
sending a scrambled first message on a first channel, wherein the scrambled first message is provided by scrambling a first message according to the scrambling code starting from a slot of a radio frame indicated by the slot number and the radio frame number.

2. The method according to claim 1, wherein the first message includes at least one of the group consisting of: control information, a part of a control information, an encoded control information, and a part of an encoded control information.

3. The method according to claim 1, wherein the first channel is a physical downlink control channel.

4. The method according to claim 1, wherein the first channel is a physical uplink control channel.

5. The method according to claim 1, wherein the scrambling a first message according to the scrambling code is a symbol-level scrambling.

6. A message receiving method, comprising:
generating a scrambling code according to a scrambling code initialization seed $c_{init}$, wherein the scrambling code initialization seed meets the following expression:

$$c_{init}=(N_{ID}^{Ncell}+1)((10n_f+\lfloor n_2/2 \rfloor)\bmod k_{14}+1)\cdot 2^9 + N_{ID}^{Ncell}, \text{ wherein } k_{14} \text{ is an integer power of 2,}$$

wherein $N_{ID}^{Ncell}$ is a cell identity, $n_f$ is a radio frame number, and $n_s$ is a slot number;
receiving a scrambled first message on a first channel starting from a slot of a radio frame indicated by the slot number and the radio frame number; and
descrambling the scrambled first message according to the scrambling code to obtain a first message.

7. The method according to claim 6, wherein the first message includes at least one of the group consisting of: control information, a part of a control information, an encoded control information, and a part of an encoded control information.

8. The method according to claim 6, wherein the first channel is a physical downlink control channel.

9. The method according to claim 6, wherein the first channel is a physical uplink control channel.

10. The method according to claim 6, wherein the descrambling the scrambled first message according to the scrambling code is a symbol-level descrambling.

11. An apparatus, comprising:
at least one processor; and
at least one computer readable memories coupled to the at least one processor and storing instructions that, when the instructions are performed by the at least one processor, cause the apparatus to:
generate a scrambling code according to a scrambling code initialization seed $c_{init}$, wherein the scrambling code initialization seed meets the following expression:

$$c_{init}=(N_{ID}^{Ncell}+1)((10n_f+\lfloor n_2/2 \rfloor)\bmod k_{14}+1)\cdot 2^9 + N_{ID}^{Ncell}, \text{ wherein } k_{14} \text{ is an integer power of 2,}$$

wherein $N_{ID}^{Ncell}$ is a cell identity, $n_f$ is a radio frame number, and $n_s$ is a slot number;
send a scrambled first message on a first channel, wherein the scrambled first message is provided by scrambling a first message according to the scrambling code starting from a slot of a radio frame indicated by the slot number and the radio frame number.

12. The apparatus according to claim 11, wherein the first message is control information, or a part of control information, or encoded control information, or a part of encoded control information.

13. The apparatus according to claim 11, wherein the first channel is a physical downlink control channel.

14. The apparatus according to claim 11, wherein the first channel is a physical uplink control channel.

15. The apparatus according to claim 11, wherein the scrambling a first message according to the scrambling code is a symbol-level scrambling.

16. An apparatus, comprising:
at least one processor; and
at least one computer readable memories coupled to the at least one processor and storing instructions that, when the instructions are performed by the at least one processor, cause the apparatus to:
generate a scrambling code according to a scrambling code initialization seed $c^{init}$, wherein the scrambling code initialization seed meets the following expression:

$$c_{init}=(N_{ID}^{Ncell}+1)((10n_f+\lfloor n_2/2 \rfloor)\bmod k_{14}+1)\cdot 2^9 + N_{ID}^{Ncell}, \text{ wherein } k_{14} \text{ is an integer power of 2,}$$

wherein $N_{ID}^{Ncell}$ is a cell identity, $n_f$ is a radio frame number, and $n_s$ is a slot number;
receive a scrambled first message on a first channel starting from a slot of a radio frame indicated by the slot number and the radio frame number; and
descramble the scrambled first message according to the scrambling code to obtain a first message.

17. The apparatus according to claim 16, wherein the first message is control information, or a part of control information, or encoded control information, or a part of encoded control information.

18. The apparatus according to claim 16, wherein the first channel is a physical downlink control channel.

19. The apparatus according to claim 16, wherein the first channel is a physical uplink control channel.

20. The apparatus according to claim 16, wherein the descrambling the scrambled first message according to the scrambling code is a symbol-level descrambling.

* * * * *